(12) United States Patent
Fukuma et al.

(10) Patent No.: US 6,634,754 B2
(45) Date of Patent: Oct. 21, 2003

(54) EYEGLASS FRAME SELECTING SYSTEM

(75) Inventors: Yasufumi Fukuma, Tokyo (JP); Takeyuki Kato, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 138 days.

(21) Appl. No.: 09/809,873

(22) Filed: Mar. 16, 2001

(65) Prior Publication Data
US 2001/0022649 A1 Sep. 20, 2001

(30) Foreign Application Priority Data

| Mar. 17, 2000 | (JP) | 2000-75531 |
| Mar. 17, 2000 | (JP) | 2000-76913 |
| Mar. 8, 2001 | (JP) | 2001-64328 |
| Mar. 8, 2001 | (JP) | 2001-64329 |

(51) Int. Cl.⁷ ................ A61B 3/04
(52) U.S. Cl. .................... 351/227
(58) Field of Search .............. 351/205, 204, 351/227, 246, 177, 178; 33/507, 200; 705/26, 27; 382/117; 396/18

(56) References Cited

U.S. PATENT DOCUMENTS

| 4,852,184 A | 7/1989 | Tamura et al. |
| 5,280,570 A | 1/1994 | Jordan |
| 5,983,201 A * | 11/1999 | Fay .............. 705/27 |
| 6,142,628 A | 11/2000 | Saigo |
| 6,231,188 B1 * | 5/2001 | Gao et al. .......... 351/227 |

FOREIGN PATENT DOCUMENTS

| EP | 1 011 006 A1 | 6/2000 | ......... G02C/13/00 |
| JP | 61-80222 | 4/1986 | ......... G02C/1/00 |
| JP | 62262821 | 11/1987 | ......... G02C/13/00 |
| JP | 63-76581 | 4/1988 | ......... H04N/5/272 |
| JP | 1-147517 | 6/1989 | ......... G02C/13/00 |
| JP | 06139318 | 5/1994 | ......... G06F/15/60 |
| WO | WO98/52092 | 11/1998 | ......... G02C/13/00 |
| WO | WO99/40526 | 8/1999 | ......... G06F/17/50 |

\* cited by examiner

Primary Examiner—George Manuel
(74) Attorney, Agent, or Firm—Chapman and Cutler

(57) ABSTRACT

An eyeglass frame selecting system in which the eyeglass lens picture can be synthesized with the eyeglass frame image and the customer's facial image so that the effect for the eyeglass lens based on the lens prescription value of the customer can be known, is provided. The eyeglass frame selecting system comprises a keyboard 3 for inputting the prescription value data of an eyeglass lens and a lens mold contour data based on the refraction property of a customer's objective eye, and an operation control circuit 1b for synthesizing the eyeglass lens image based on the prescription value of the lens inputted by the keyboard 3 and a facial image 20 with the eyeglass frame image L through a picture synthesizing circuit 10 to display the synthesized image on a display device 8.

9 Claims, 14 Drawing Sheets

EYEGLASS FRAME SELECTING SYSTEM

BACKGROUND OF THE INVENTION

1. Field of the Invention

The present invention relates to an eyeglass frame selecting system in which a selected eyeglass frame image and an eyeglass lens image are overlapped and synthesized with a customer's facial image.

2. Description of the Prior Art

As this kind of eyeglass frame selecting system, for example, there is an eyeglass making apparatus disclosed in Japanese Patent Laid-Open No. Sho 61-80222, an eyeglasses wearing simulation equipment disclosed in Japanese Patent Laid-Open No. Sho 63-76581, or an apparatus disclosed in Japanese Patent Application No. Sho 62-306998.

In the above-mentioned eyeglass frame selecting system, a plurality of eyeglass frame images are recorded in a recording means, the recorded eyeglass frame images are successively called out to be displayed on a displaying screen, and at the same time, the called eyeglass frame images are synthesized with the customer's facial image photographed by a television camera to be displayed, thereby, the customer can look at the state when wearing the eyeglass frame on the displaying screen, though the customer does not wear the selected eyeglass frame actually.

However, in case of shortsightedness, a concave lens is used as the eyeglass lens, and in case of long-sightedness, a convex lens is used as the eyeglass lens. And, the customer's eye size viewed through the eyeglass lens is different from the customer's actual eye size. For example, the customer's eye size viewed through the concave lens seems to be smaller than the actual size, and the customer's eye size viewed through the convex lens seems to be larger than the actual size.

In this phenomenon, if the shortsightedness or the long-sightedness degree of the customer is small, the customer's eye size viewed through the eyeglass lens is almost the same as the actual size.

However, if the shortsightedness or the long-sightedness degree of the customer is large, the spherical diopter or the cylindrical diopter of the eyeglass lens prescribed based on the refraction property of the objective eye becomes high. When the eyeglass lenses made based on this prescription value (the eyeglasses prescription value, that is, the lens prescription value) are inserted to the eyeglass frame and the customer wears the eyeglass frame, the customer's eye size viewed through the eyeglass lens seems to be different from the customer's actual eye size.

However, since the above-mentioned eyeglass frame selecting system simply synthesizes the eyeglass frame image with the customer's facial image without considering the refraction property of the eyeglass lens, the eye image size synthesized with the eyeglass lens image is different from that of the eye image viewed through the actual eyeglass lens.

Accordingly, in case where the eyeglass lenses based on the actual prescription value are inserted to the eyeglass frame selected by the above-mentioned eyeglass frame selecting system and the customer wears the eyeglass frame to which the eyeglass lenses are inserted, the relationship between the customer's eye size viewed through the eyeglass lens and the appearance of eyeglass frame is very different from the relationship between the eye size and the eyeglass frame selected by the eyeglass frame selecting system.

As the result, when the customer wears the eyeglass frame which is selected by the eyeglass frame selecting system and is attached with the actual eyeglass lenses, the customer may express a complaint because the appearance is different from an image of the eyeglass frame image when the eyeglass frame is selected.

In addition, the edge thickness varies according to the material of the eyeglass lens, though the lens prescription value is equal. Namely, when the lens prescription value is equal, the edge thickness of the eyeglass lens becomes thin in the order of the material of low refraction, middle refraction, and high refraction. However, the eyeglass lens becomes expensive in the order of the material of the low refraction, the middle refraction, and the high refraction.

In addition, in case where the refraction degree of the eyeglass lens is high, since the edge thickness becomes very thick in a glass lens or low refractive lens, the edge of the eyeglass lens is too protruded from the lens frame (rim) of the eyeglass frame in the forward or backward direction when the eyeglass lenses are inserted to the eyeglass frame, and thus, the appearance becomes deteriorated Accordingly, in case where the customer selects the eyeglass lens, the customer must consider the relationship between the price and the edge thickness.

However, the above-mentioned eyeglass frame selecting system simply synthesizes the eyeglass frame image with the customer's facial image to select the eyeglass frame only from the synthesized picture without considering the edge thickness of the actual eyeglass lens based on the lens prescription value.

As the result, the material of the eyeglass lens is selected without recognizing the relationship between the edge thickness of the eyeglass lens and the eyeglass frame to which the actual eyeglass lenses are inserted.

SUMMARY OF THE INVENTION

Thus, the object of the present invention is to provide an eyeglass frame selecting system in which the eyeglass lens picture can be synthesized with the eyeglass frame image and the customer's facial image so that the effect for the eyeglass lens based on the lens prescription value of the customer can be known.

In order to accomplish the object of the present invention, in an eyeglass frame selecting system comprising an eyeglass frame inputting means for inputting a plurality of eyeglass frame images including the eyeglass frame of a rimless frame, an eyeglass frame recording means for recording a plurality of eyeglass frame images inputted by said eyeglass frame inputting means, a photographing means for photographing the customer's facial image, a display means for displaying said facial image photographed by said photographing means, a frame picture selecting means for selecting one of the plurality of eyeglass frame images recorded in said eyeglass frame recording means, and a picture synthesizing means for synthesizing the eyeglass frame image selected by said frame picture selecting means with the facial image displayed on said display means, the eyeglass frame selecting system of the present invention comprises a data inputting means for inputting a lens prescription value of the eyeglass lens based on the refraction property of said customer's objective eye, an operation control means for obtaining the sizes of the facial image and the eyeglass lens image of the lens prescription value inputted by said data inputting means, synthesizing the eyeglass lens image and the facial image having the obtained sizes with said eyeglass frame image through said picture synthesizing means so as to display the synthesized image on said display means.

Also, said picture synthesizing means may be set so that an eye image having the eye size viewed through the eyeglass lens of said lens prescription value data in said facial image is synthesized in the eyeglass lens image of said eyeglass frame to display the synthesized image on said display means.

Further, said picture synthesizing means may be set so that the lateral image of the eyeglass lens obtained from said lens prescription value data and the lens mold contour data are synthesized with a lateral facial image as said facial image together with said eyeglass frame image and the eyeglass lens image to display the synthesized image on said display means.

In addition, said operation control means may obtain said lens mold contour data by an operation from the size and contour of the eyeglass frame displayed on the display means and the display magnification thereof.

In case where said operation control means may obtain the lateral image of the eyeglass lens from the lens mold contour data inputted by a lens mold contour measuring device and said lens prescription value data.

Also, said operation control means may be set to display a chamfered contour of an end of the edge on the lateral image of the lens when the simulation of chamfering process of the end of the edge of the lateral image of the lens displayed on said display means is performed.

In addition, said operation control means may be set so that the refractive index of the material of the lens is selected by a material selecting means, thereby, a thickness of the lateral image of the lens is obtained from the selected refractive index, said lens prescription value and the lens mold contour data, and the obtained lateral image of the lens is synthesized with said lateral facial image together with said eyeglass frame image and the eyeglass lens image to display the synthesized image on said display means.

Said operation control means may be set so that a previous synthesized display picture and a present synthesized display picture are displayed in parallel when contour or thickness of the lateral image of the lens which is synthesized with said lateral facial image and displayed, has been changed.

BRIEF DESCRIPTION OF THE ATTACHED DRAWINGS

FIG. 1(a) schematically illustrates the eyeglass frame selecting system according to the present invention, and FIG. 1(b) is a control circuit diagram of the personal computer in FIG. 1(a).

DESCRIPTION OF THE PREFERRED EMBODIMENT

The embodiments of the present invention will be explained with reference to the accompanying drawings.
[Construction]

Figure 1A:
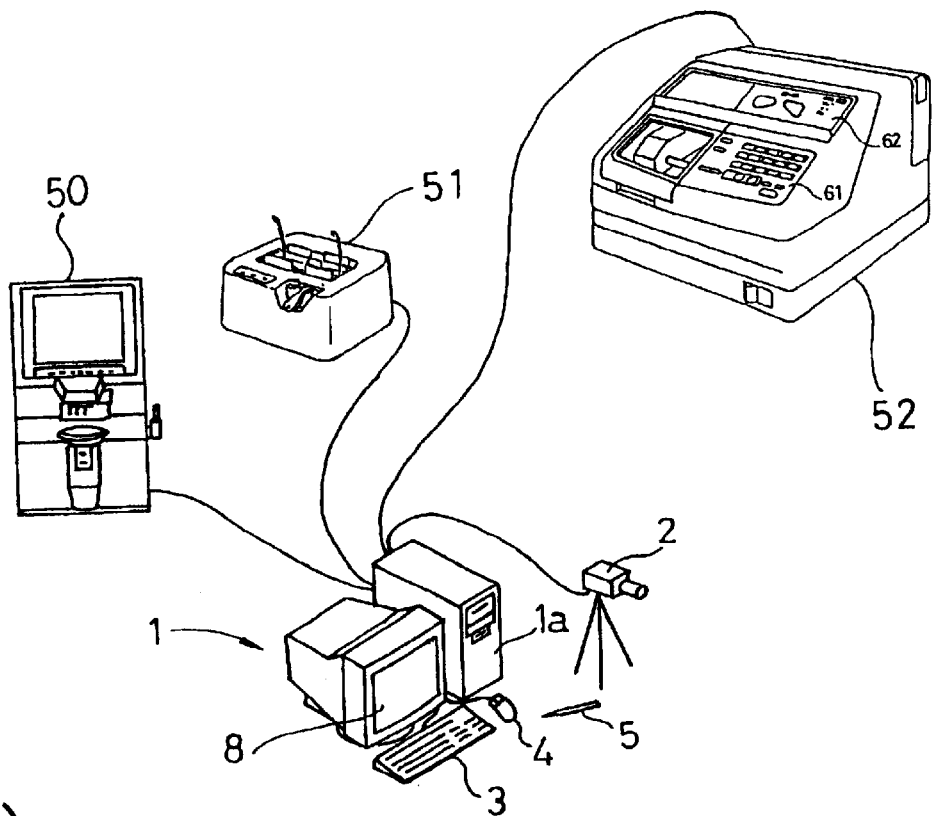
Figure 1B:
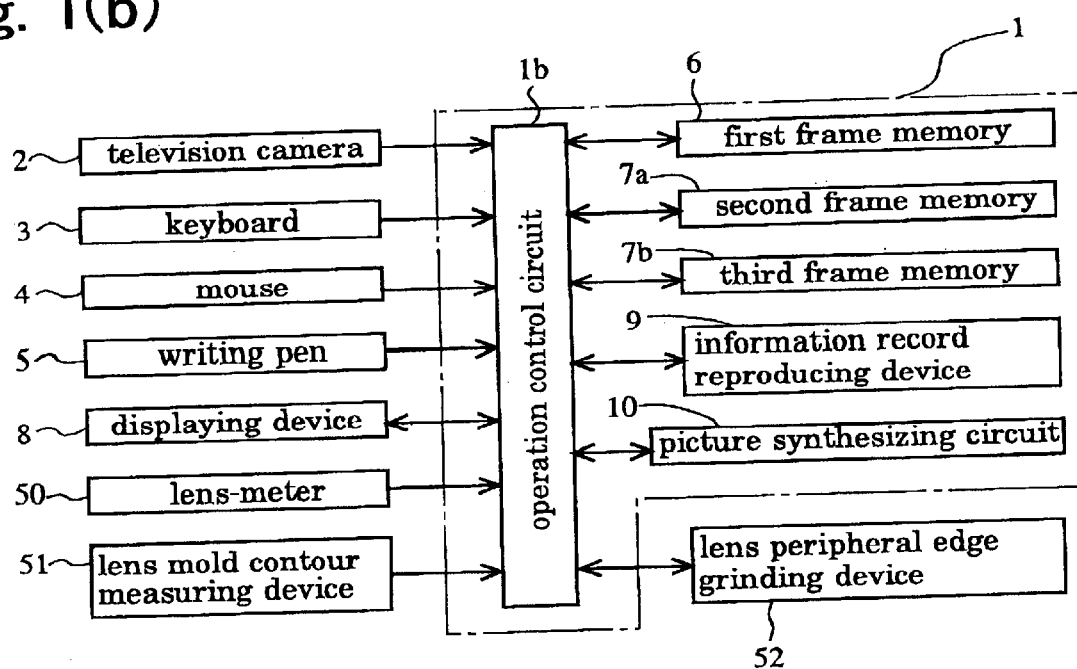

FIGS. 1(a) and 1(b) show an eyeglass frame selecting system according to the present invention. In FIG. 1(a), 1 is a personal computer of the eyeglass frame selecting system, and 1a is a body of the personal computer 1. An operation control circuit (the operation control means) 1b shown in FIG. 1(b) is contained in the body 1a.

2 is a television camera (the photographing means) connected to the operation control circuit 1b as a picture inputting means. The television camera 2 is used to photograph the customer's facial image (figure image) or the eyeglass frame, and the photographed picture signal is inputted to the operation control circuit 1b. And, the eyeglass frame includes a frame having the lens frame or a rimless frame.

In addition, the personal computer 1 has a picture selecting means such as a keyboard 3, a mouse 4, and a writing pen 5 and a displaying device (display means) such as a monitor television. The keyboard 3 is used as a data inputting means. In other words, the keyboard 3 is used to input the customer's PD (the inter-pupil distance) or the eyeglass frame data, etc. Also, the keyboard 3 can be used to input the data of the lens prescription value data of the eyeglass lens.

Figure 2:
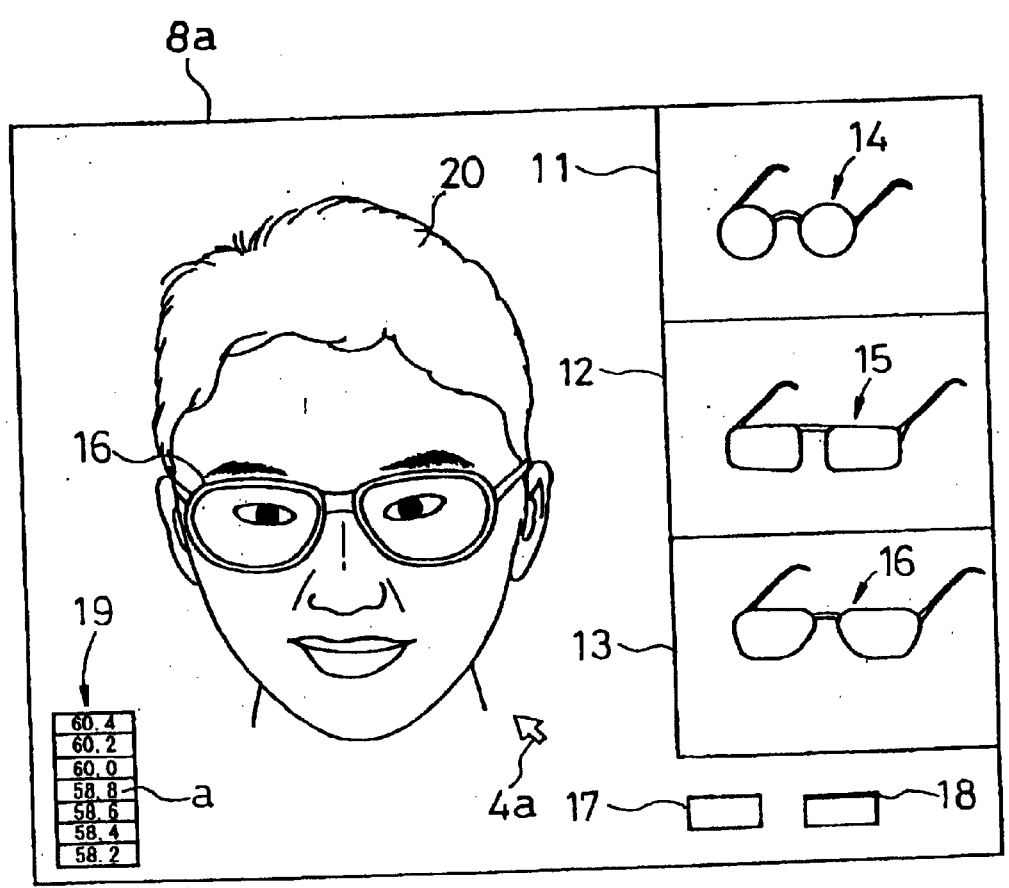
FIG. 2 illustrates the eyeglass frame selecting screen according to the control circuit shown in FIG. 1.
Figure 5:
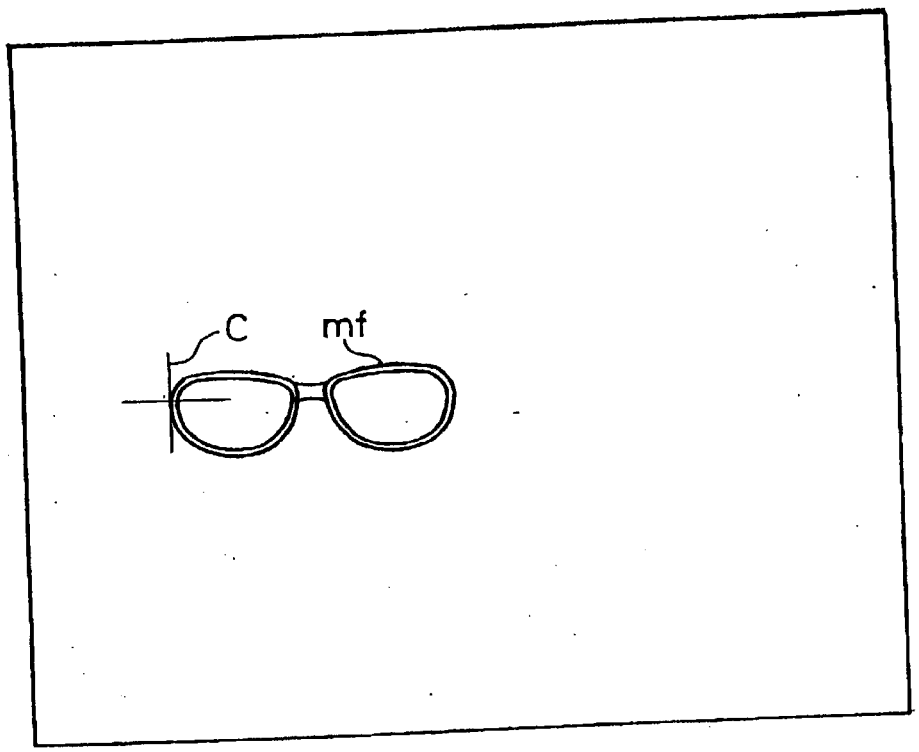
FIG. 5 illustrates the work for obtaining the display magnification of the eyeglass frame image in FIG. 4.
Figure 6:
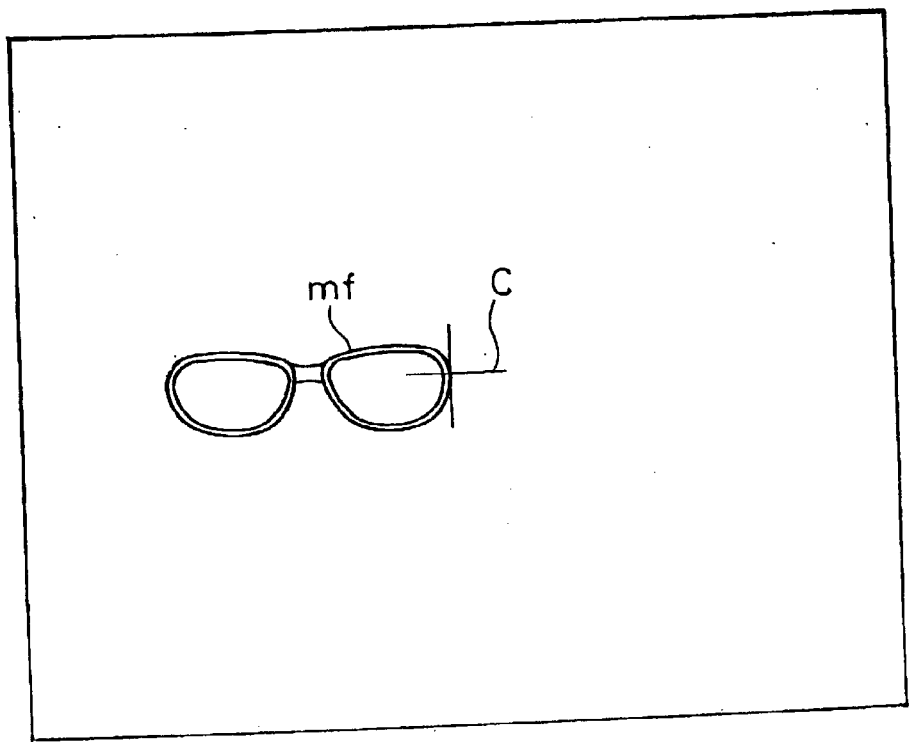
FIG. 6 illustrates the work for obtaining the display magnification of the eyeglass frame image in FIG. 4.

The mouse 4 generally performs the operation for moving an arrow-shaped cursor 4a as shown in FIG. 2, and performs the operation for moving a cross-shaped cursor C as shown in FIGS. 5 and 6 when the size is measured. Also, the mouse 4 and the cursor 4a are used as a material selecting means. Also, a monitor television is used as a displaying device 8, but the liquid crystal display device may be use And, first to third picture memories (storage means) 6, 7a, 7b shown in FIG. 1(b), an information record reproducing device 9 as a frame recording means and a picture synthesizing circuit (a picture synthesizing means) 10 are contained in the body 1. The first to third picture memories 6, 7a, 7b and the information record reproducing device 9, and the picture synthesizing circuit 10 are connected to the operation control circuit 1b. A mass record reproducing means such as hard disk and optical magnetic disk (MO, CD-ROM, CDR, etc) is used as the information record reproducing device 9.

Also, a lens-meter 50, a lens mold contour measuring device (a frame contour measuring device) 51, and the lens peripheral edge grinding device 52, etc. are connected to the operation control circuit 1b.

[Operation]

Hereinafter, the function and operation of the operation control circuit 1b of the eyeglass frame selecting system having the above-mentioned construction will be described.

When the system is operated and a right button of the mouse 4 (not shown) is clicked, a menu (not shown) is displayed in the displaying device 8. In the menu, items (modes) such as the lens prescription value input of the eyeglass lens, the lens mold contour data input, the eyeglass frame photographing, the figure photographing, and the eyeglass frame selection are displayed. As the lens prescription value, there is a spherical diopter S, a cylindrical diopter C, and a cylindrical axis angle A of the lens or the inter-pupil distance PD. Also, a plurality of eyeglass frame images and the lens mold contour data ($\theta i$, $\rho i$) corresponding to the respective eyeglass frame images are recorded in the information record reproducing device 9. Also, the lens mold contour data ($\theta i, \rho i$) may be inputted to the lens mold contour measuring device 51 if model frames exist in the optician.

And, according to the material or refraction degree of the eyeglass lens, the curvature radiuses of the front refraction surface and the rear refraction surface of the lens and the lens thickness data at the center of the optical axis or the lens thickness data (information) from the center of the optical axis to the peripheral edge are recorded as the lens thickness information in the information record reproducing device 9.

The lens mold contour data ($\theta i, \rho i$) and the eyeglass frame image and the lens thickness information are stored in a host computer of a frame maker or a lens maker or a host computer of a data center, and may be taken out by the personal computer 1 through Internet.

(1) Eyeglass Frame Image

<Eyeglass Frame Selecting Screen>

The above-mentioned menu is opened by the mouse 4, and the item for selecting the eyeglass frame is selected. By this selection, the operation control circuit 1b allows a screen 8a of the displaying device 8 to display the items "a frame contour name and a brand name, etc.". And, the operation control circuit 1b reads the eyeglass frame picture fitting the frame contour based on the display frame data constructed in the first picture memory 6 from the information record reproducing device 9 when the frame contour name is selected, and reads the eyeglass frame picture corresponding to the brand based on the display frame data constructed in the first picture memory 6 from the information record reproducing device 9 when the brand name is selected. Like this, the eyeglass frame image relating to the frame contour name or the brand name is recorded in the information record reproducing device 9 which functions as the frame recording means. Also, the mouse 4 which functions as the picture selecting means can select one of a plurality of eyeglass frame images recorded in the information record reproducing device 9 which functions as the frame recording means in accordance with the frame contour name or the brand name.

Then, the operation control circuit 1b allows the screen 8a of the displaying device 8 to display the showing boxes 11, 12, 13 for selecting the eyeglass frame by the picture synthesizing circuit 10, as shown in FIG. 2.

And, the operation control circuit 1b constructs the data on the different types of eyeglass frames 14, 15, 16 which are read from the information record reproducing device 9 according to the frame contour name or the brand name, etc., in the data on the showing boxes of the first picture memory 6 to display the images of the eyeglass frames 14, 15, 16 on the showing boxes 11, 12, 13 as the eyeglass frame selecting screen, respectively.

At this time, the images of the eyeglass frames 14, 15, 16 displayed on the showing boxes 11, 12, 13 are the three-dimensional picture which is obliquely photographed at the top front. Thus, the eyeglass frames 14, 15, 16 become the state easy to view a lens frame LF or a temple T, etc. Particularly, it is difficult to obtain an esthetic appreciation as a design in the relationship with the lens frame, etc., unless the temple T is viewed obliquely. As the present embodiment, the eyeglass frames 14, 15, 16 are obliquely viewed at the top front, and thus, the esthetic appreciation as the design can be obtained. As the result, the customer can select the favorite eyeglass frame more actually.

And, in the present embodiment, any one of the eyeglass frame images 14–16 can be selected by clicking the cursor 4a of the mouse 4 at any one of the showing boxes 11–13. The selected eyeglass frame is displayed in the outside of the showing boxes 11–13 through the third picture memory 7b as a synthesized display magnification Mx as described later.

<Display Change of Eyeglass Frame>

The display of the eyeglass frame in the showing boxes 11–13 may be changed to the new one by clicking a button 17 displayed on the screen 8a, and may be returned to the display before one by clicking a button 18 displayed on the screen 8a.

<Display Size (Magnification) Changing Means>

And, when any one of the eyeglass frames 14–16 is selected by clicking the cursor 4a of the mouse 4 at any one of the showing boxes 11–13, for example, when the eyeglass frame 16 is selected, the operation control circuit 1b allows the displaying device to display the selected eyeglass frame 16 in the outside of the showing boxes 11–13 as shown in FIG. 2. At this time, the operation control circuit 1b allows the displaying device to display a size changing menu 19 for optionally changing the display a size of the selected eyeglass frame image at the left bottom of the screen 8a as the size changing means.

And, in case where the number of the size of the selected eyeglass frame is one, the size is displayed on the size changing menu 19 by numerical value, and in case where the number of the size of the selected eyeglass frame is plural, the plural sizes are displayed on the size changing menu 19 by numerical value as shown in the drawing. Accordingly, when selecting the eyeglass frame, a user can know quickly whether the size fitting the user exists or not.

Also, the size changing menu 19 displays a plurality of size changing values by stages at the upper and lower sides of the reference value (standard value) a.

In the present embodiment, the reference value is set to 58.8 mm, the values 60.0 mm, 60.2 mm, and 60.4 mm increased by 0.2 mm are displayed at the upper side of the reference value 58.8 mm, and the values 58.6 mm, 58.4 mm, and 58.2 mm decreased by 0.2 mm are displayed at the lower side of the reference value 58.8 mm. The values of the upper and lower sides are automatically changed by changing the reference value a, and the changed value may be not 0.2 mm, but 0.3 mm or less. The display of such set menu is omitted.

<Input Example of the Eyeglass Frame Image>

Figure 3:
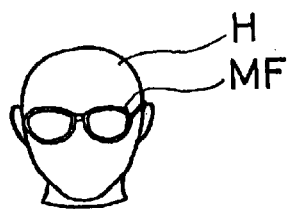
FIG. 3 illustrates the photographing the eyeglass frame (the eyeglass frame picture data input).
Figure 3:
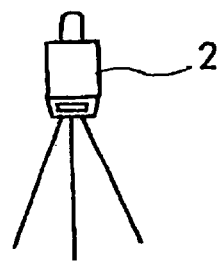

The eyeglass frame image which is recorded in the information record reproducing device 9 and is displayed on the showing boxes 11, 12, 13 can be obtained by inserting an eyeglass frame MF to the model's face H and photographing the eyeglass frame MF by a television camera 3, as shown in FIG. 3.

Figure 4:
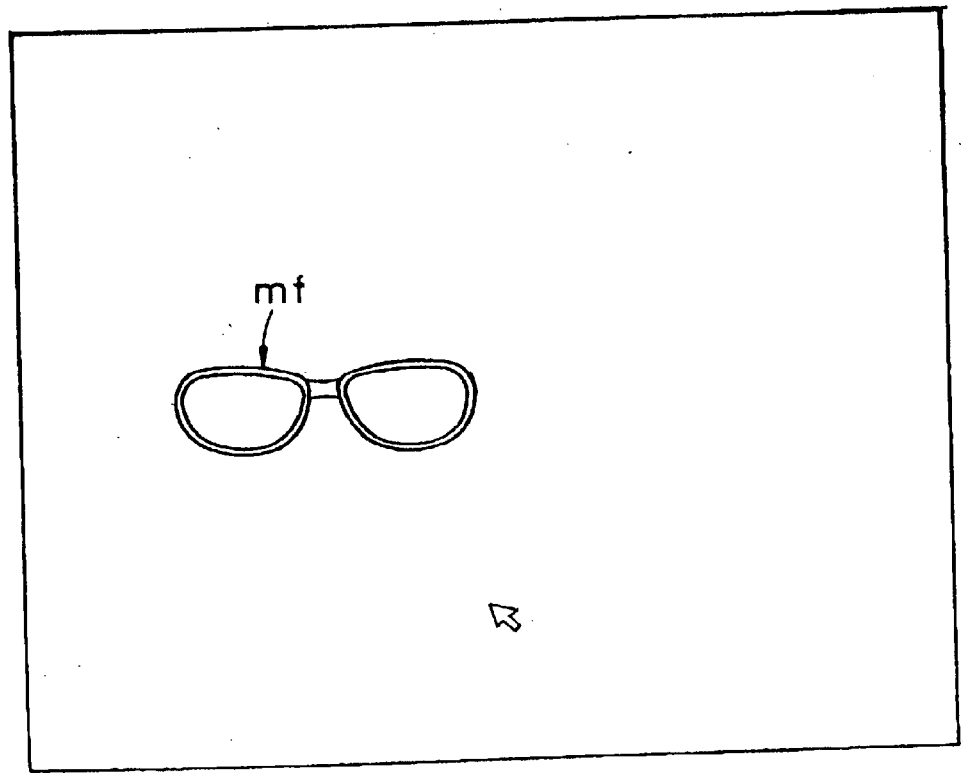
FIG. 4 illustrates the eyeglass frame image which is photographed by the television camera in FIG. 3 and is displayed on the screen.

At this time, the picture signal outputted from the television camera 3 by photographing is inputted to the operation control circuit 1b to construct the data of the eyeglass frame image at the second picture memory 7a by the operation control circuit 1b. An eyeglass frame image mf as shown in FIG. 4 is displayed on the screen 8a based on the data constructed in the second picture memory 7a.

And, as shown in FIGS. 5 and 6, the display size of the eyeglass frame image mf is automatically obtained by fitting the cross cursor C with the left and right ends of the displayed eyeglass frame image mf. On the other hand, the photographed eyeglass frame MF data (the data recorded in the temple of the eyeglass frame), for example, the data such as the distance between the geometrical centers of the frames—the bridge interval (interval between the left and right lens frames)—the left and right sizes of the eyeglass frame is previously inputted through the keyboard 3.

Thus, the operation control circuit 1b can obtain a display magnification Ma of the photographed eyeglass frame image mf from the data of the eyeglass frame MF, and the left and right distance of the eyeglass frame image mf which is actually photographed and displayed or the bridge interval. And, the operation control circuit 1b processes the eyeglass frame MF as a picture of a synthesis display magnification Mx used in synthesizing the eyeglass frame image mf actually, based on the obtained display magnification Ma of the eyeglass frame image mf. As the synthesis display magnification Mx, for example, the magnification such as ½ (0.5 times) or ⅓ of the actual object, etc. can be considered. The data of the eyeglass frame image of the obtained synthesis display magnification Mx is recorded in the information record reproducing device 9.

Also, since the display magnification and display size of the eyeglass frame image mf are previously known, the expansion or reduction magnification of the eyeglass frame image which is varied by 0.2 mm at the upper and lower sides of the reference value can be easily obtained by the operation control circuit 1b.

And, the data of the eyeglass frame image can be constructed by the picture process using software such as CAD. In this case, the keyboard 3 or the mouse 4 functions as the eyeglass frame inputting means.

(2) Facial Image (Figure Image) Input

Figure 7:
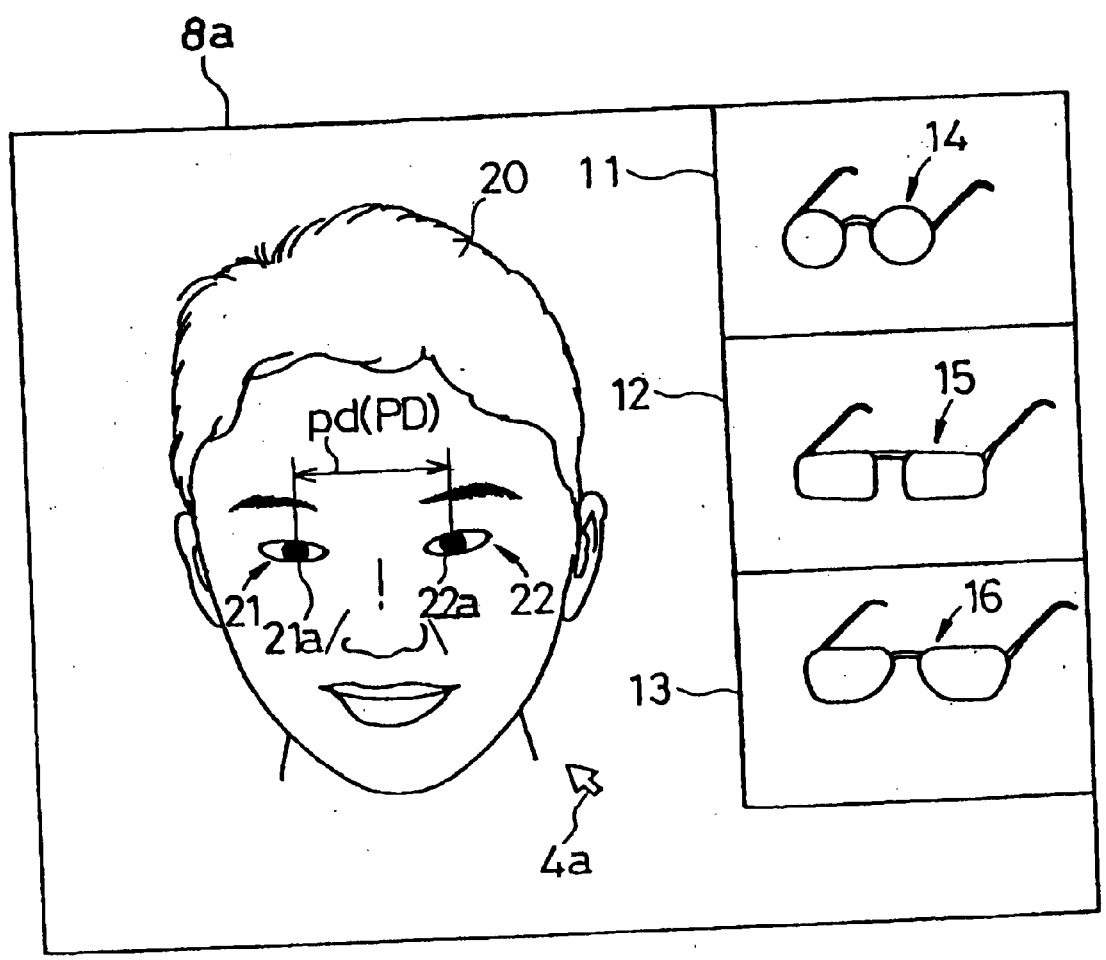
FIG. 7 illustrates the display of the customer's facial image.

As described in the above, the picture photographed by the television camera 2 is constructed in the second picture memory 7a by the operation control circuit 1b. When the customer's facial image (figure image) is photographed by the television camera 2, the facial image data is constructed in the second picture memory 7a by the operation control circuit 1b. And, the operation control circuit 1b allows the screen 8a of the displaying device 8 to display the facial image 20 through the picture synthesizing circuit 6, based on the customer's facial image (figure image) data constructed in the second picture memory 7a, as shown in FIG. 7.

Figure 8:
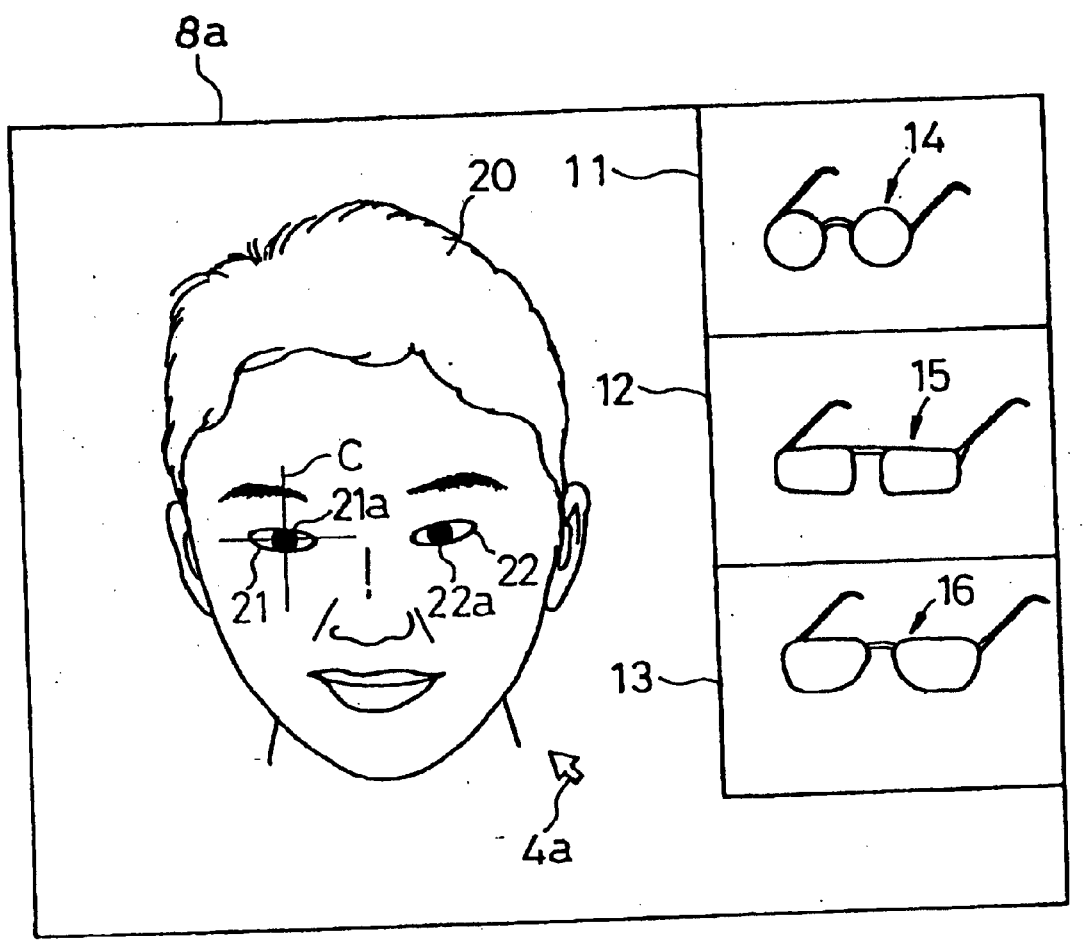
FIG. 8 shows a diagram for obtaining the display magnification of the customer's facial image.
Figure 9:
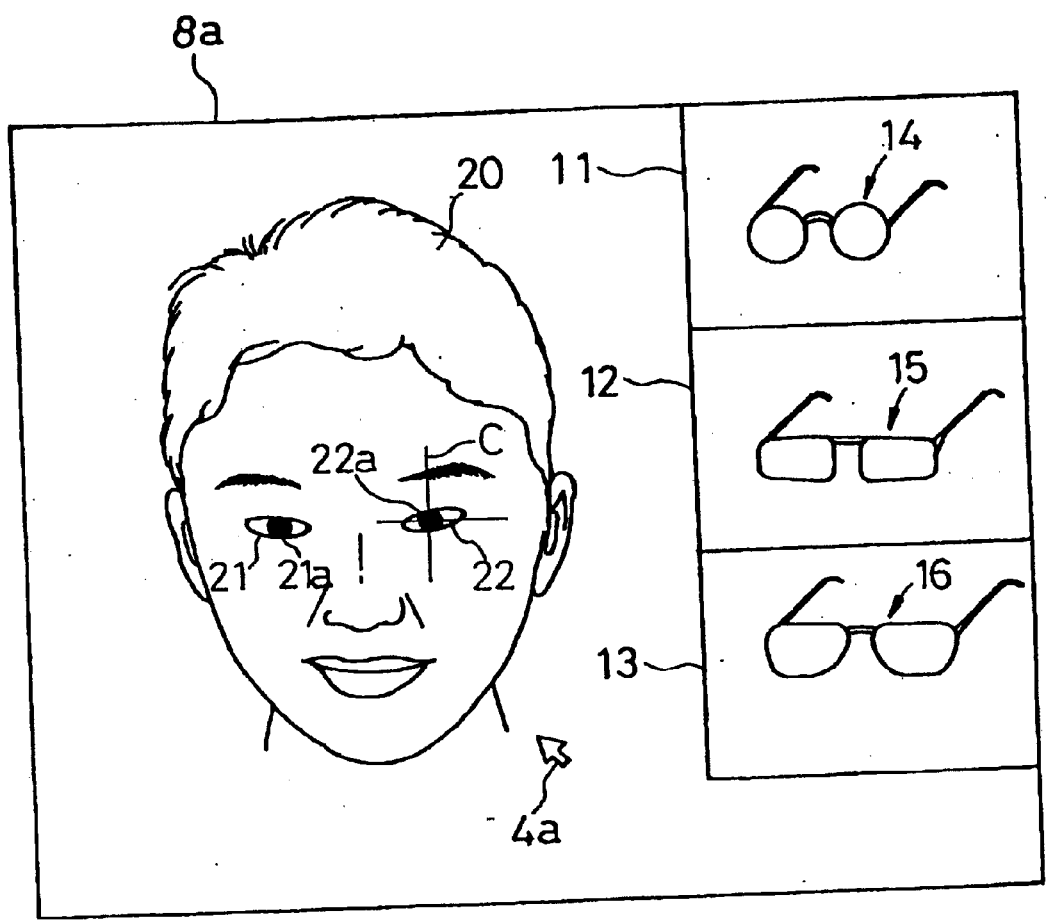
FIG. 9 shows a diagram for obtaining the display magnification of the customer's facial image.

This photographing is performed in the state that the customer views an object at the distance of 5 m or more, and the distance pd between the centers of pupils 21a, 21b of a left eye image 21 and a right eye image 22 in the photographed facial image 20 becomes the display size of the inter-pupil distance PD. Accordingly, the operation control circuit 1b can easily obtain the distance pd between the centers of the pupils 21a, 22a of the left and right eye images 21, 22 as the display size by clicking the cross cursor C at the centers of the pupils 21a, 21b of the left and right eye images 21, 22 in the facial image 20, as shown in FIGS. 8 and 9. And, the operation control circuit 1b obtains the customer's actual inter-pupil distance PD data inputted through the keyboard 3 and the actual display magnification Mb of the facial image from the distance pd (display size) between the centers of the pupils 21a, 22a of the above-mentioned left and right eye images 21, 22.

And, in order to synthesize the facial image 20 with the eyeglass frame image, the operation control circuit 1b processes the facial image 20 as the picture having the size of the synthesis display magnification Mx used in actual synthesis based on the obtained display magnification Mb of the facial image 20.

(3) Synthesis of the Eyeglass Frame to the Facial Image
<Synthesis from the Front>

First, when the eyeglass frame selecting system is operated, the operation control circuit 1b allows the displaying device to display the showing boxes 11–13 through the first picture memory 6 and the picture synthesizing circuit 10.

At this state, as mentioned above, the customer's face is photographed by the television camera 2, the picture signal of the photographed face is inputted to the operation control circuit 1b. The operation control circuit 1b processes the photographed facial image 20 as the picture having the size of the synthesis magnification Mx based on the display magnification Mb when photographing, and allows the facial image 20 having the size of the synthesis display magnification Mx to be displayed at the outside of the showing boxes 11–13 on the screen 8a of the displaying device 8 through the second picture memory 7a and the picture synthesizing circuit 10.

Then, any one of the eyeglass frames 14–16 is selected by clicking the cursor 4a of the mouse 4 at any one of the showing boxes 11–13. Thus, the operation control circuit 1b allows the displaying device to display the selected eyeglass frame overlapped on the facial image 20 at the size of the synthesis display magnification Mx through the second picture memory 7a and the picture synthesizing circuit 10.

At this time, the eyeglass frame image is selected and synthesized with the facial image 20 does not use a three-dimensional image, but a two-dimensional image, unlike the image for selecting the eyeglass frame. This is the reason why the synthesis of the three-dimensional eyeglass frame with the facial image is difficult. And, as described in the above, the eyeglass frame image obliquely viewed is recorded in the information record reproducing device 9 which is the frame recording means, as the picture for selecting three-dimensional frame, and at the same time, the eyeglass frame image viewed from the front in connection with the picture for selecting the frame is recorded as the picture for synthesizing the picture.

In the present embodiment, the eyeglass frame image 16 is selected by clicking the cursor 4a of the mouse 4 at the showing box 14. And, the operation control circuit 1b constructs the selected eyeglass frame image 16 in the third picture memory 7b, and overlaps the eyeglass frame image 16 with the facial image 20 at the size of the synthesis display magnification Mx through the picture synthesizing circuit 10. The eyeglass frame image 16 can be moved in up, down, left, and right directions by dragging the cursor 4a of the mouse 4 at the portion of the overlapped eyeglass frame image 16.

And, the eyeglass frame image 16 can be rotated in the clockwise or counterclockwise direction. This operation can be easily performed by specifying the rotating center, the rotating direction, and the rotating angle by the mouse 4, as performed by a figure drawing program such as CAD. The display size of the eyeglass frame image 16 is set to the reference value a at the beginning.

When the size of the eyeglass frame image 16 having the reference value a does not fit that of the facial image 20, since the size of the eyeglass frame image 16 is simply and quickly changed to the size having the selected value by clicking the cursor 4a of the mouse 4 at any one of the values 58.2–58.6 and 60.0–60.4, the size of the selected eyeglass frame image 16 can be quickly adjusted. This selection may be performed using the writing pen 5.

At this time, since the operation process for changing the size is not performed with respect to the facial image 20 and only the necessary minimum data of the eyeglass frame image 16 displayed on the third picture memory 7b may be sufficient, the operation process for changing the size does not take much time. Also, the size of the eyeglass frame can be more quickly changed by way of preparing previously the eyeglass frame image having the size corresponding to each value.

In the present embodiment, since the first to third picture memories 6, 7a, 7b are prepared, a plane for displaying the showing boxes 11–13 for the eyeglass frame displaying screen and the display size selecting menu 19 are constructed in the first picture memory 6, a plane for displaying the facial image 20 is constructed in the second picture memory 7a, and a plane for displaying the selected eyeglass frame is constructed in the third picture memory 7b to allow them to be synthesized and displayed, the operation for changing the size of the selected eyeglass frame or aligning the eyeglass frame to the facial image can be simply and quickly performed.

As described in the above, when the synthesized picture of the facial image 20 and the eyeglass frame image 16 is displayed on the screen 8a of the displaying device 8, the customer can judge easily whether the eyeglass frame fits the customer's taste or face or not from the synthesized picture. Accordingly, the eyeglass frame fitting the customer can be selected by changing sequentially the selection of the eyeglass frame image synthesized with the facial image 20.

(4) Size Correction of the Eye Image Based on the Lens Prescription Value

When the lens prescription value of the eyeglass lens based on the refraction property of the customer's objective eye is inputted to the operation control circuit 1b through the keyboard 3 as the data inputting means before or after synthesis of the eyeglass frame, the operation control circuit 1b performs the corrected display of display size of the eye images 21, 22 from the lens prescription value as follows.

And, as the lens prescription value, there is the spherical diopter S, the cylindrical diopter C, and the cylindrical axis angle A or the inter-pupil distance PD of the lens.

(a) Data Correction of the Eye Image Size by Inputting the Lens Prescription Value Before Synthesis Namely, in case where the lens prescription value is inputted before synthesis, the operation control circuit 1b corrects the size data of the eye images 21, 22 of the facial image 20 based on the customer's lens prescription value before the selected eyeglass frame is synthesized with the facial image 20.

For example, in case where the customer's objective eye is the short-sightedness, the size data of the eye images 21, 22 are corrected to the small value to fit the refraction degree of the lens prescription value, and in case where the customer's objective eye is the long-sightedness, the size data of the eye images 21, 22 is corrected to the large value to fit the refraction degree of the lens prescription value.

And, when the selected eyeglass frame image is synthesized with the facial image 20 through the picture synthesizing circuit 10 and is displayed on the screen 8a of the displaying device 8, the operation control circuit 1b allows the eye images 21, 22 of which size is smaller than the display magnification of the facial image 20 to be displayed, based on the corrected size data.

(b) Size Correction of the Eye Image by Inputting the Lens Prescription Value after Synthesis As described in the above, in case where the above lens prescription value is inputted after the eyeglass frame image is synthesized with the facial image 20 and is displayed on the screen 8a of the displaying device 8, the operation control circuit 1b corrects the size of the eye images 21, 22 of the synthesized picture, based on the customer's lens prescription value. In this case, similar to the above-mentioned, for example, in case where the customer's objective eye is a short-sightedness, the size data of the eye images 21, 22 is corrected to the small value to fit the refraction degree of the lens prescription value, and again, the synthesis of the images is performed and the synthesized image is displayed, based on this size data in the state that the eye images 21, 22 are corrected to the smaller value than the display magnification of the synthesized image. Similarly, in case where the customer's objective eye is long-sightedness, the size data of the eye images 21, 22 is corrected to the large value to fit the refraction degree. Also, the operation control circuit 1b again synthesize and display the eye images 21, 22 on the screen 8a of the displaying device 8 through the picture synthesizing circuit 10 in the state that the eye images 21, 22 are corrected to the larger value than the display magnification of the synthesized picture, based on this size data.

(c) As the result, when the eyeglass lenses based on the customer's lens prescription value are inserted to the eyeglass frame and the customer wears the eyeglass frame, the eye image having the customer's actual eye size viewed by a third party views through the eyeglass lens or the eye image having the customer's actual eye size viewed through a mirror can be synthesized with the eyeglass frame at the very natural state. Accordingly, since the eyeglass frame is synthesized with the facial image at the more natural state, when wearing eyeglass frame which is selected in the eyeglass frame selecting system and is attached with the actual eyeglass lenses, the actual image looks equal to the eyeglass frame image when the selection is performed, and thus, the satisfactory selection of the eyeglass frame can be possible.

(5) Lateral Image Display of the Eyeglass Lens

Also, when the lateral image La of the eyeglass lens L and the eyeglass frame image 16 are displayed, it becomes a mode that the eyeglass frame image 16 and eyeglass lens L are synthesized with the customer's lateral facial image (the facial image viewed in the lateral direction) 20a to display the synthesized image using the keyboard 3 or the mouse 4, before or after synthesis of the eyeglass frame image 16.

On the other hand, when the lateral image La is displayed, the lens prescription value data of the eyeglass frame based on the refraction property of the customer's objective eye are inputted to the operation control circuit 1b through the keyboard 3 which is the data inputting means, and at the same time, the lens mold contour data of the eyeglass lens (the lens mold contour information) ($\theta i$, $\rho i$) is inputted by the lens mold contour measuring device 51 which is the data inputting means to the operation control circuit 1b.

Also, the material of the eyeglass lens is displayed on the screen 8a and any one of the displayed materials of the eyeglass lens is selected using the keyboard 3 or the mouse 4. By this selection, the operation control circuit 1*b* reads the thickness data of the lens (the information) from the center of the optical axis to the edge or the thickness data of the lens in the center of the optical axis and the curvature radiuses of the front refraction surface and the rear refraction surface of the lens, according to the material or the refraction degree of the selected eyeglass lens L from the information record reproducing device 9.

Then, the operation control circuit 1*b* obtains the edge thickness Wi of the lens in the moving radius ρi from the read data and the lens mold contour data (θi, ρi) at the angle θi as the edge thickness of the eyeglass lens.

And, the operation control circuit 1*b* obtains the edge thickness DWi of the edge thickness image (the lens lateral image of the eyeglass lens) of the eyeglass lens for synthesizing the eyeglass frame image from the display magnification (the magnification with respect to the actual value) of the eyeglass frame image and the obtained edge thickness Wi of the lens at the angle θi every moving radius ρi, as the synthesis size.

Figure 11:
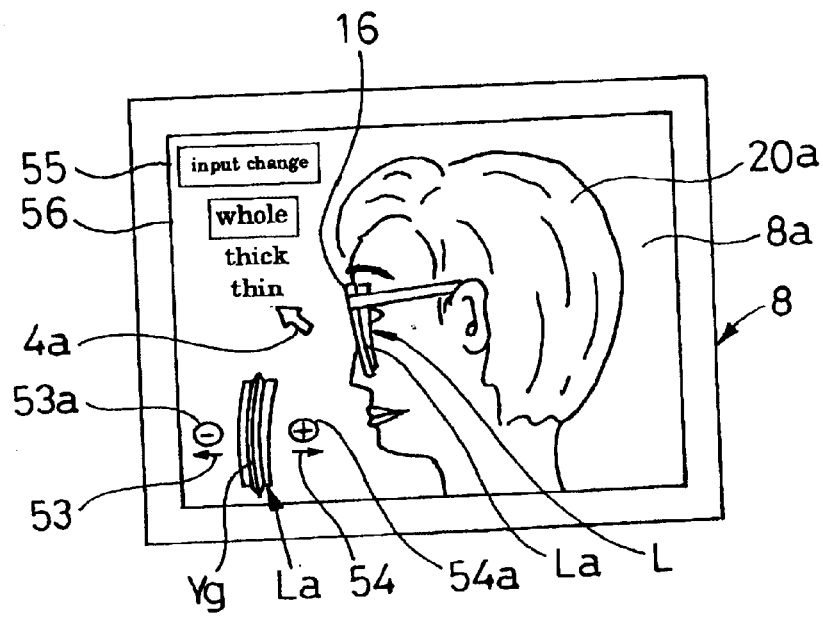
FIG. 11 shows a diagram for synthesizing the lateral image of the eyeglass lens with the customer's lateral facial image to display the synthesized image.
Figure 12:
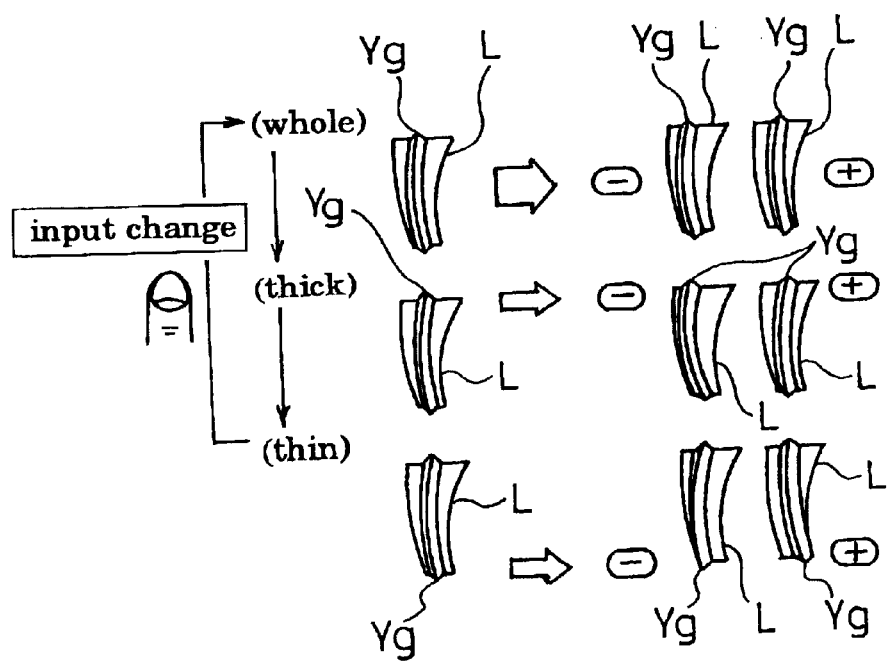
FIG. 12 illustrates a moving operation example of V-shape.

And, the operation control circuit 1*b* synthesizes the lateral image of the lens (the edge thickness image) La which the eyeglass lens image L is viewed in the lateral direction (the side) with the eyeglass frame image 16 and the customer's lateral facial image (the facial image) 20*a* through the picture synthesizing circuit 10 to display the synthesized picture on the screen 8*a* of the displaying device 8, based on the edge thickness DWi at the lens mold contour data (θi, ρi), as shown in FIG. 11. At this time, the lateral image (the end image of side of the edge) La of the eyeglass lens image L is also displayed at the left bottom portion of the screen 8*a* of the displaying device 8.

The V-shape Yg of the lateral image (the end image of side of the edge) of the eyeglass lens image L is also displayed on the screen 8*a*, and at the same time, the "−" button 53*a* used for moving the V-shape Yg in the left direction shown by the arrow 53 is displayed at the left of the lateral image La, and the "+" button 54*a* used for moving the V-shape Yg in the right direction shown by the arrow 54 is displayed at the right of the lateral image La.

Also, the button 55 of "input change" is displayed on the screen 8*a*, and at the same time, "whole", "thick", and "thin" representing the moving operation mode of the V-shape are displayed on the screen 8*a*, and the cursor box 56 is displayed on the screen 8*a*.

The "whole" is the mode for moving the whole V-shape Yg in parallel in the left and right direction, the "thick" is the mode for rotationally moving the portion with the maximum edge thickness of the V-shape Yg around on the minimum edge location of the V-shape Yg in the left and right directions, and the "thin" is the mode for rotationally moving the portion with the minimum edge thickness of the V-shape Yg around on the maximum edge location of the V-shape Yg in the left and right directions.

And, the cursor box 56 is moved in the order of the modes "whole", "thick", and "thin" by clicking the cursor 4*a* of the mouse 4 at the button 55 of "input change", and the moving operation mode of the V-shape Yg is selected whenever clicking.

After this selection, the V-shape Yg is minutely moved in the left direction according to the selected V-shape moving operation mode by clicking the cursor 4*a* of the mouse 4 at the button 53*a*, and the V-shape Yg is minutely moved in the right direction according to the selected V-shape moving operation mode by clicking the cursor 4*a* of the mouse 4 at the button 54*a*.

Also, since the lateral image La of the eyeglass lens L is moved to the left and right direction (the direction opposite to the moving direction of the V-shape) with respect to the eyeglass frame image 16 according to the moving operation to the left and right directions of the V-shape Yg, the protruded amount which the lateral image La of the eyeglass lens L is protruded from the side of the eyeglass frame image 16 in the front and rear sides can be changed (adjusted). This change (adjustment) is simply performed in consideration of the customer's taste and appearance.

Since the lens lateral image of the eyeglass lens (the edge thickness image) is synthesized with the eyeglass frame image and the customer's facial image considering the edge thickness of the actual eyeglass lens based on the lens prescription value, the eyeglass lens or the eyeglass frame can be selected, considering the effect of the edge thickness of the eyeglass lens for the appearance. Also, at this time, by changing the materials of the eyeglass lens to the materials having the low refraction, the middle refraction and the high refraction, the displayed edge thickness can be changed to confirm the location relationship between the edge thickness and the eyeglass frame. Also, at this time, the location for forming the V-shape is changed in relation of the eyeglass frame, and can be used to set the location of the V-shape most suitable for the eyeglass frame.

Also, the obtained location data of the V-shape Yg is transmitted to the lens peripheral edge grinding device 52, and can be used as the V-shape location data when the V-shape process is performed.

Also, the above-mentioned lens mold contour data (θi, ρi), the V-shape location data or the lens prescription value (the prescription of the eyeglasses) is inputted to the lens-meter 50 or the lens peripheral edge grinding device 52, and is inputted to the operation control circuit 1*b* from the lens-meter 50 or the lens peripheral edge grinding device 52.

Also, the present embodiment represents an example in which the left facial image, the left image of the eyeglass frame image and the edge thickness image of the left eyeglass lens are displayed, but the present invention is not limited to that. Namely, the right facial image, the right image of the eyeglass frame image and the edge thickness image of the right eyeglass lens are displayed based on the lens prescription value as mentioned above.

(6) Other Parameter for Selecting the Eyeglass Frame and Lens

Also, the eyeglass lens has different specific gravity and refractive index according to the material. For example, the specific gravity of the eyeglass lens varies according to glass and plastics and the materials having the low refraction, the middle refraction, and the high refraction in the plastics. In the plastics, the specific gravity becomes large in the order of the materials having the low refraction, the middle refraction, and the high refraction. Accordingly, the weight of the eyeglass lens becomes the factor for selecting the eyeglass lens and the eyeglass frame. Also, the weight of the eyeglass frame becomes the factor for selecting the eyeglass frame.

Namely, the total weight of eyeglasses comprising the eyeglass frame and the eyeglass lens affects highly the feeling of wearing the eyeglasses. Though a person is wearing the eyeglasses actually, the weight is as light as possible, thereby it is preferable that the person does not feel like wearing the eyeglasses. Also, the balance between the weights of the lens and the frame is important, and the selection of the frame bearing the heavy lens is important than the selection of the frame having good design. It is preferable that the tool (the factor and the information) for this is displayed as follows.

Also, the ratio of the thickness of the rim (the width of the rim) of the lens frame of the eyeglass frame to which the eyeglass lenses are inserted and the edge thickness of the eyeglass lens affects the appearance. Also, the price of the eyeglass lens becomes expensive in the order of the materials having the low refraction, the middle refraction, and the high refraction.

Accordingly, it can be thought that the customer selects the eyeglass frame or eyeglass lens considering the weight of eyeglasses or the ratio of rim thickness (rim width) of the lens frame of the eyeglass frame to which the eyeglass lenses are inserted and the edge thickness of the eyeglass lens and the price.

Therefore, it is preferable that the weight of the eyeglass frame or the weight of the eyeglass lens and the total weight thereof and the price of the eyeglass lens or the eyeglass frame are displayed on the above-mentioned screen.

Also, when the processed data ($\theta i'$, $\rho i'$) of the objective lens is obtained using the lens mold contour data ($\theta i$, $\rho i$), the lens mold contour (lens contour) is displayed on the screen of the display means based on the lens mold contour data ($\theta i$, $\rho i$), and at the same time, the eye point (the optical center of the objective lens) is moved to adjacent upside with respect to the geometrical center of the lens mold contour from the customer's inter-pupil distance and the lens mold contour.

Since this technique is known, the detail description is omitted. Also, when obtaining the processed data ($\theta i'$, $\rho i'$), the lens edge thickness Wi at the processed data ($\theta i'$, $\rho i'$) is set to be obtained. The lens edge thickness Wi can be obtained by measuring the interval between the front refraction surface and rear refraction surface of the objective lens at the processed data ($\theta'$, $\rho i'$). Also, when the measurement is performed, the curvatures of the front refraction surface and the rear refraction surface of the objective lens are set to be measured.

Accordingly, in order to obtain the weight of the above-mentioned eyeglass lens, first, the volume of the eyeglass lens when the objective lens is processed to the lens mold contour is obtained from the processed data ($\theta i'$, $\rho i'$) or the lens edge thickness Wi of the objective lens and the curvatures of the front refraction surface and the rear refraction surface of the objective lens, etc., by the operation control circuit 1b. And, the weight of the eyeglass lens is obtained from the obtained volume and the specific gravity of the material of the eyeglass lens by the operation control circuit 1b.

In order to obtain the weight of the eyeglass lens, the information such as the material, the specific gravity, the price, or the refractive index of the eyeglass lens and the thickness of the rim or the price of the eyeglass frame, etc. is previously stored in the information record reproducing device 9.

MODIFIED EXAMPLE 1

Figure 10:
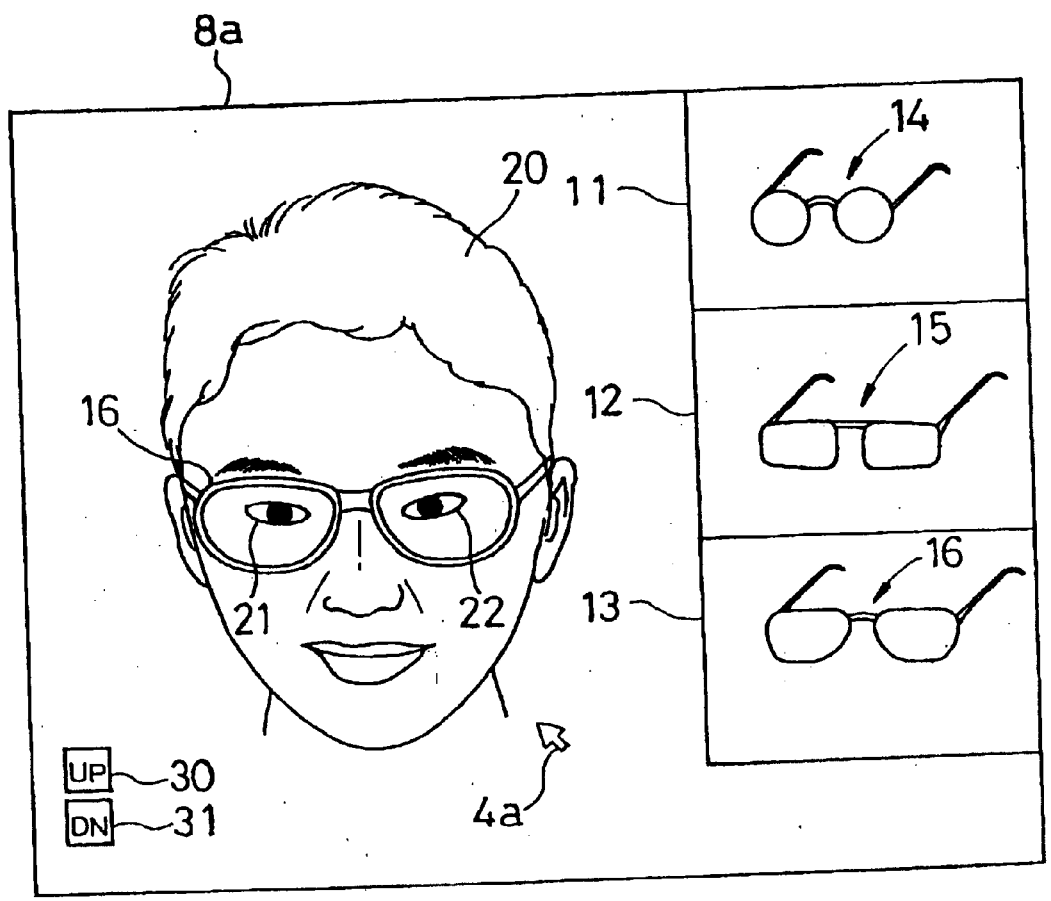
FIG. 10 illustrates another example of a size changing means of the system according to the present invention.

In the above-mentioned embodiment, the display size of the selected eyeglass frame image is set to be changed by displaying the size changing menu 19 for optionally changing the display size of the selected eyeglass frame image on the screen 8a as the size changing means and selecting the size value of the size changing menu 19, but the present invention is not limited to that. For example, as shown in FIG. 10, an up-button 30 and a down-button 31 are displayed on the displaying device 8 as the size changing means by the operation control circuit 1b, and the display size may be set to become increased from the reference value a by 0.2 mm whenever the cursor 4a of the mouse 4 is clicked at the up-button 30, and may be set to become decreased from the reference value a by 0.2 mm whenever the cursor 4a of the mouse 4 is clicked at the down-button 31.

(Others)

Also, the distance (PD) inputting means for inputting the inter-pupil distance PD is formed, and at the same time, the eyeglass frame image selected by the mouse 4 and having the size corresponding to the inter-pupil distance PD inputted by the distance inputting means is displayed on the displaying device 8 which is the display means to be synthesized with the facial image through the picture synthesizing circuit 10 (the picture synthesizing means).

MODIFIED EXAMPLE 2

Figure 13:
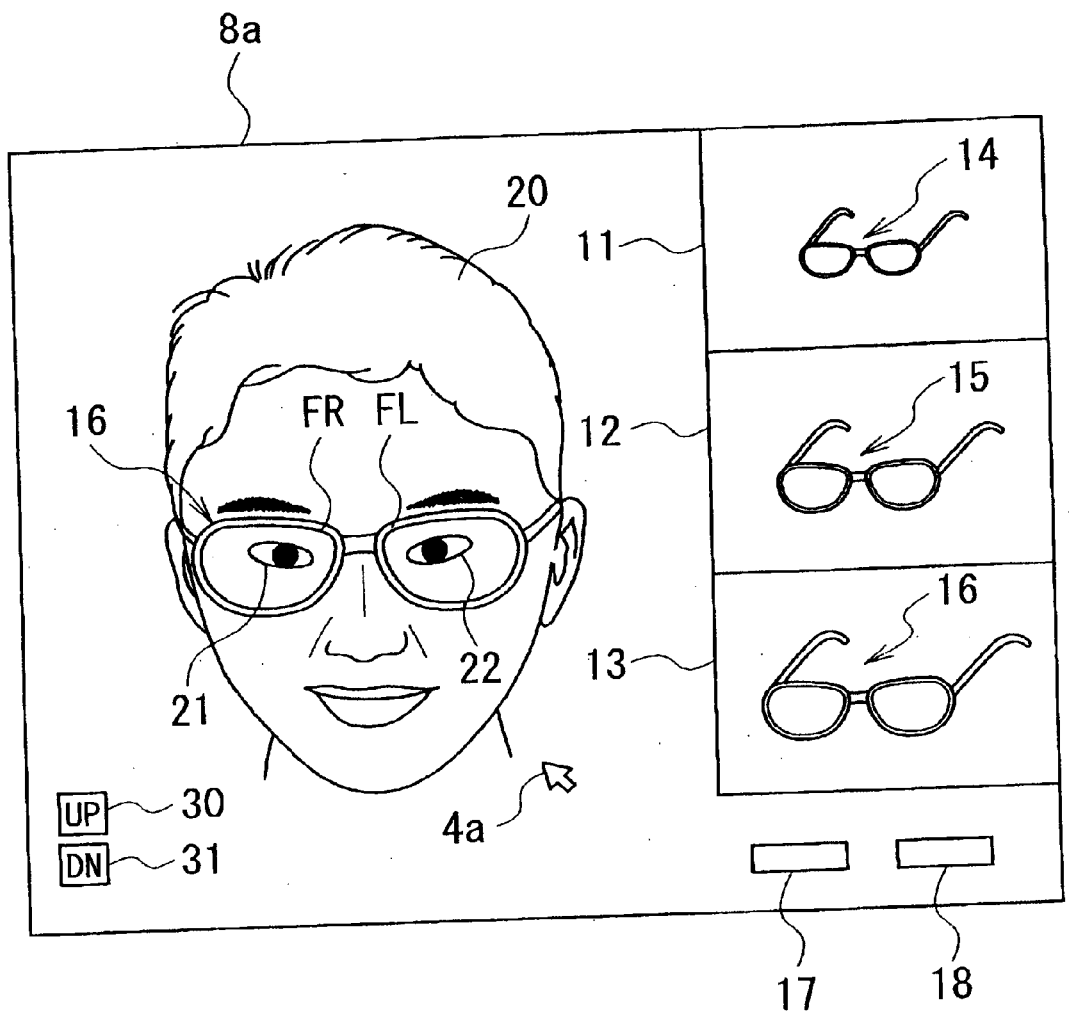
FIG. 13 shows a modified example of the eyeglass frame selecting screen according to the control circuit shown in FIG. 1.
Figure 14:
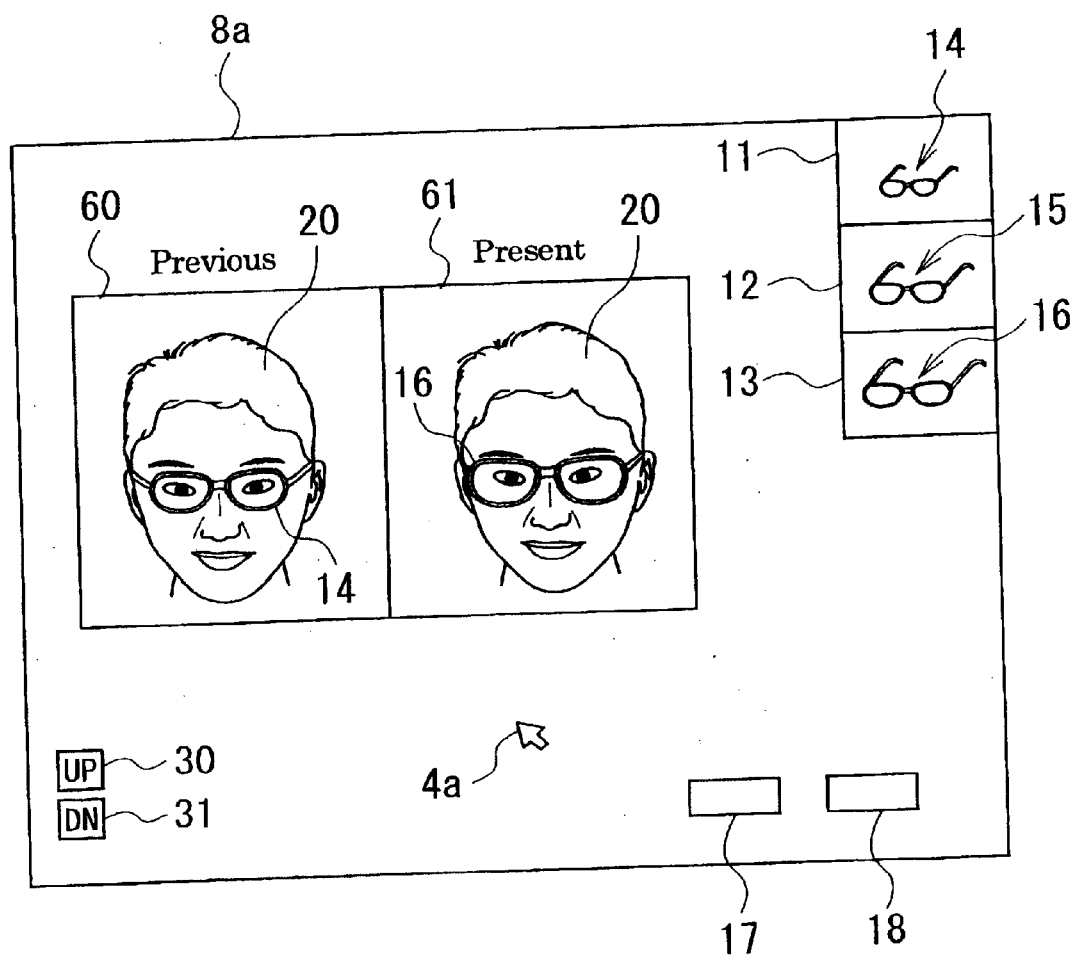
FIG. 14 shows a modified example of the eyeglass frame selecting screen according to the control circuit shown in FIG. 1.

Also, apart from the above-mentioned display, the display as shown in FIGS. 13 and 14 may be performed. In FIG. 13, the above-mentioned operation control circuit 1b allows the showing boxes 11–13 to be displayed on the displaying screen 8a of the displaying device 8, and at the same time, allows the eyeglass frame images 14, 15, 16 which have equal shape and different size to be displayed on the showing boxes 11–13 in order. And, by moving the cursor 4a to any one of the showing boxes 11–13 and clicking the button of the mouse 4, the operation control circuit 1b allows the eyeglass frame image which is displayed on the clicked showing box among the showing boxes 11–13 to be overlapped with the facial image 20 and displayed. The overlap (synthesis) of the picture is performed through the picture synthesizing circuit 10 controlled by the operation control circuit 1b. Hereinafter, the description of the picture synthesizing circuit 10 will be omitted, but the picture synthesis is performed by the same method.

Also, the operation control circuit 1b allows the sizes of the eyeglass frame images 14–16 which is displayed on the showing boxes 11–13 to be successively changed by operating the up-button 30 and the down-button 31.

Also, in FIG. 14, the operation control circuit 1b allows the display screen 8a of the displaying device 8 to display the showing boxes 60, 61 in parallel, and in addition, allows the facial image 20 and the eyeglass frame image selected previously and overlapped with the facial image 20 to be displayed on the showing box 60, and allows the facial image 20 and the eyeglass frame image selected presently and overlapped with the facial image 20 to be displayed on the showing box 61. Also, in the present modified example, the facial image 20 and the eyeglass frame image 14 having the small size are overlapped and displayed on the showing box 60, and the facial image 20 and the eyeglass frame image 16 having the large size are overlapped and displayed on the showing box 61. According to this display, it can be seen that the eyeglass frame image 16 displayed on the showing box 61 rather than the eyeglass frame image 14 displayed on the showing box 60 fits the customer's face by comparison.

MODIFIED EXAMPLE 3

Figure 15:
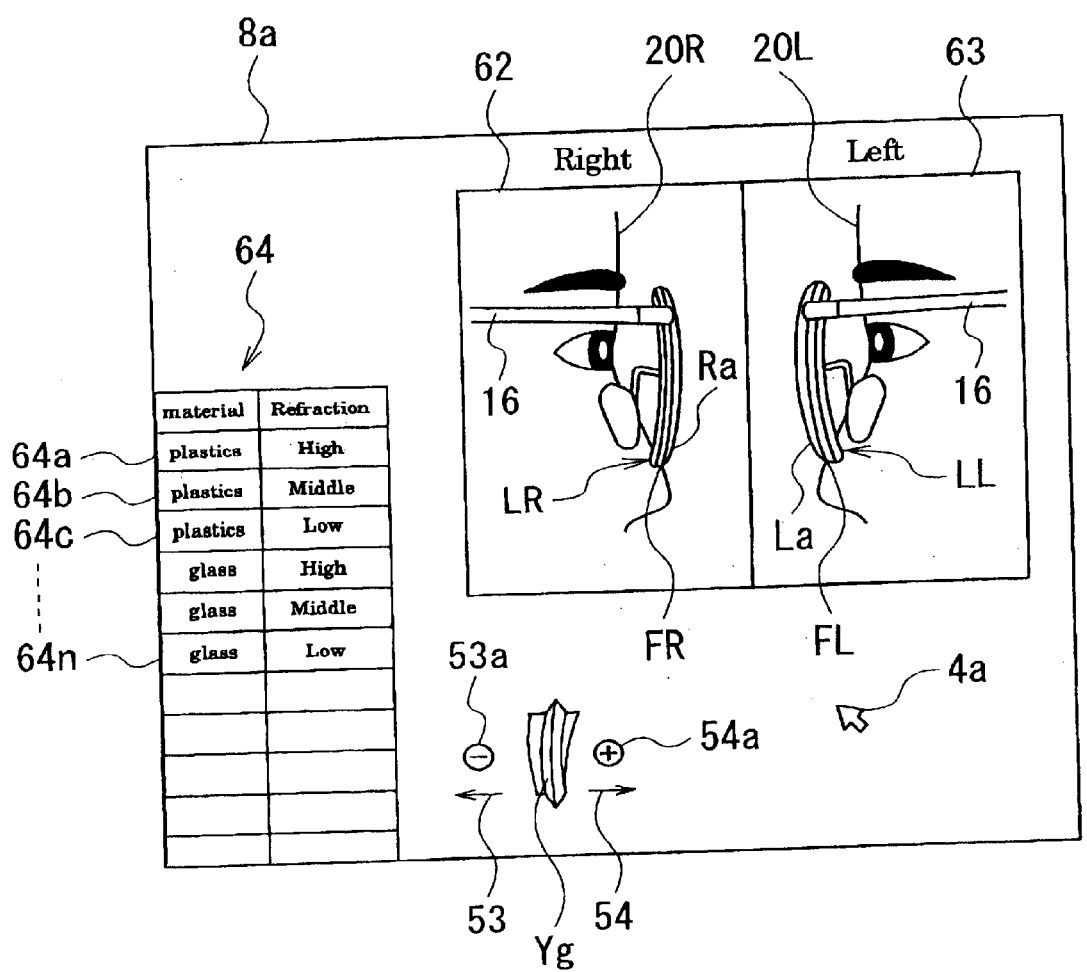
FIG. 15 shows an example for displaying the side of the eyeglass lens according to the control circuit shown in FIG. 1.
Figure 16:
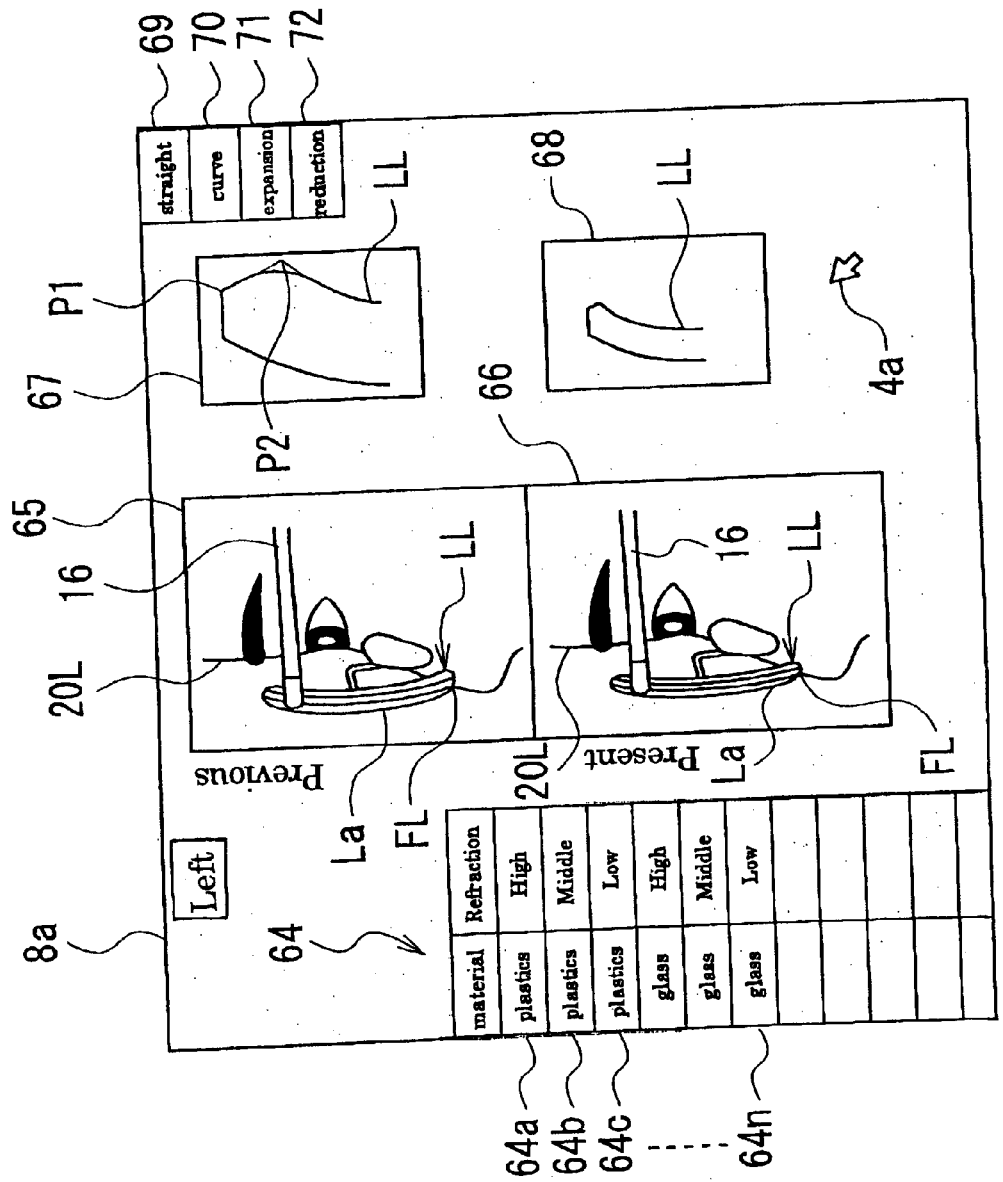
FIG. 16 shows an example for displaying the side of the eyeglass lens according to the control circuit shown in FIG. 1.

Also, apart from the above-mentioned display, the display as shown in FIGS. 15 and 16 may be performed. In FIG. 15, the operation control circuit 1b allows the showing boxes 62, 63 to be displayed in parallel on the display screen 8a of the displaying device 8 in the left and right directions, and at the same time, allows the customer's right lateral facial image (the facial image viewed in the right side) 20R and the selected eyeglass frame image (for example, the eyeglass frame image 16) to be overlapped and displayed on the showing box 62, and at the same time, allows the customer's left lateral facial image (the facial image viewed in the left side) 20L and the selected eyeglass frame image (for example, the eyeglass frame image 16) to be overlapped and displayed on the showing box 63. Also, the right lens frame image FR and the left lens frame image FL of the eyeglass frame image 16 are overlapped and displayed in the right lateral facial image 20R and the left lateral facial image 20L, respectively, and at the same time, the end images of the edge (that is, the edge thickness images) Ra, La which are the side contour of the eyeglass lens images LR, LL (the lateral images of the lens) which are respectively inserted to the right lens frame image FR and left lens frame image FL are overlapped and displayed.

As shown in FIG. 11 and in the description thereof, the operation of the thickness of the lateral images of the lens (that is, the edge thickness images) Ra, La or the display based on this operation is performed by the operation control circuit 1b, based on the lens prescription value (the prescription of the eyeglasses). Also, the operation control circuit 1b selects one of the showing boxes 62, 63 by moving the cursor 4a to any one of the showing boxes 62, 63 and clicking the button of the mouse 4. Also, by clicking the cursor 4a of the mouse 4 at the "−" button 53a and the "+" button 54a, the operation control circuit 1b changes the location of the V-shape Yg in the left and right directions, and changes and displays the location of the front and rear direction of the end images of the edge (that is, the edge thickness images) Ra, La with respect to the right lens frame image FR or the left lens frame image FL in the showing box 62 or 63.

MODIFIED EXAMPLE 4

Also, in the same refraction degree, when the material of the lens varies according to the materials having low refractive index, middle refractive index, and high refractive index, the thickness varies according to the material of the lens. In other words, in case of the same refraction degree, the thickness of the lens is reduced in the order of the materials of the lens having the low refractive index, the middle refractive index, and the high refractive index. Therefore, according to such material of the lens, the thickness viewed at the side of the eyeglass lens is obtained as the end image of the edge based on the refraction degree of the lens prescription value (the prescription of the eyeglasses), and the obtained end image of the edge is overlapped with the lateral image of the eyeglass frame and the lateral facial image and displayed, thereby the balance between the lateral thickness of the lens and the lateral facial image may be seen.

Accordingly, the operation control circuit 1b allows the showing box 64 showing the material and refractive index to be displayed on the displaying screen 8a of the displaying device 8. As the refraction power display, "high" representing the high refractive index, "middle" representing the middle refractive index, and "low" representing the low refractive index are displayed at the right of the material.

Also, as described in the above, by moving the cursor 4a to any one of the showing boxes 62, 63 and clicking the button of the mouse 4, one of the showing boxes 62, 63 is selected, and then, by selecting and clicking any one of the material showing box portions 64a, 64b, 64c, . . . 64n in the showing box 64 by the cursor 4a of the mouse 4, the operation control circuit 1b performs the following control.

Namely, the operation control circuit 1b calculates the thickness of the end images of the edge (that is, the edge thickness images) Ra, La which the eyeglass lens image LR (or LL) is viewed at the side, based on the one selected from the material showing box portions 64a, 64b, 64c, . . . 64n and the lens prescription value (the prescription of the eyeglasses) of the eyeglass lens image LR (or LL) of the selected showing box 62 (or 63). And, the operation control circuit 80 synthesizes the end images of the edge (that is, the edge thickness images) Ra, La of the eyeglass lens image LR (or LL) having the calculated thickness with the right lens frame image FR (or the left lens frame image FL) of the eyeglass frame image 16 to display the synthesized image, and simultaneously, overlaps the right lateral facial image 20R (or the left lateral facial image 20L) to display the overlapped image.

However, in case where the refraction degree of the lens based on the lens prescription value (the prescription) is small though the cheap material such as glass or plastics having low refractive index is used, the thickness of the end images of the edge (that is, the edge thickness images) Ra, La which the eyeglass lens image LR (or LL) synthesized with the right lens frame image FR (or the left lens frame image FL) of the eyeglass frame image 16 is viewed at the side does not become thick. In this case, the end images of the edge (that is, the edge thickness images) Ra, La of the eyeglass lens image LR (or LL) viewed at the side does not damage the appearance.

However, in case where the refraction degree of the lens based on the lens prescription value (the prescription) is large, when the cheap material such as the glass or plastics having low refractive index is used, the thickness of the end images of the edge (that is, the edge thickness images) Ra, La which the eyeglass lens image LR (or LL) synthesized with the right lens frame image FR (or the left lens frame image FL) of the eyeglass frame image 16 viewed at the side tends to become very thick. In this case, since the end images of the edge (that is, the edge thickness images) Ra, La of the eyeglass lens image LR (or LL) is viewed at the side is thick, the appearance seems to be damaged.

When the appearance seems to be damaged, by the selecting the "middle" of the middle refractive index among the material showing box portions 64a, 64b, 64c, . . . 64n in the above-mentioned showing box 64, the thickness of the end images of the edge (that is, the edge thickness images) Ra, La of the eyeglass lens image LR (or LL) synthesized with the right lens frame image FR (or the left lens frame image FL) of the eyeglass frame image 16 becomes thinner than that when the material of the low refractive index is used. Also, in this selection, in case where the thickness of the end images of the edge (that is, the edge thickness images) Ra, La which the eyeglass lens image LR (or LL) synthesized with the right lens frame image FR (or the left lens frame image FL) of the eyeglass frame image 16 is viewed at the side is thick, by selecting the "high" of the high refractive index among the material showing box portions 64a, 64b, 64c, . . . 64n in the above-mentioned showing box 64, the thickness of the end images of the edge (that is, the edge thickness images) Ra, La which the eyeglass lens image LR (or LL) synthesized with the right lens frame image FR (or the left lens frame image FL) of the eyeglass frame image 16 can become much thinner. Also, since the thickness of the end images of the edge (that is, the edge thickness images) Ra, La of the eyeglass lens image LR (or LL) synthesized with the right lens frame image FR (or the left lens frame image FL) of the eyeglass frame image 16 is overlapped with the right lateral facial image 20R (or the left lateral facial image 20L) and is displayed, by changing the thickness of the end images of the edge (that is, the edge thickness images) Ra, La of the eyeglass lens image LR (or LL) according to the selection of the material fitting the refractive index as mentioned in the above, it can be simply and quickly judged whether the balance relating to the right lens frame image FR (or the left lens frame image FL) or the size of the right lateral facial image 20R (or the left lateral facial image 20L) is largely destroyed or not.

Also, apart from the right lens frame image FR (or the left lens frame image FL) of the eyeglass frame image 16 or the right lateral facial image 20R (or the left lateral facial image 20L), the showing box for displaying the side contour of the eyeglass lens image LR (or LL) is formed. Accordingly, in case of changing only the lateral thickness of the eyeglass lens image LR (or LL) in the showing box, it is impossible that the above-mentioned balance is simply and quickly judged, because it is difficult that the lateral thickness of the eyeglass lens image LR (or LL) is judged from the relationship between the right lens frame image FR (or the left lens frame image FL) of the eyeglass frame image 16 or the right lateral facial image 20R (or the left lateral facial image 20L).

MODIFIED EXAMPLE 5

Figure 17:
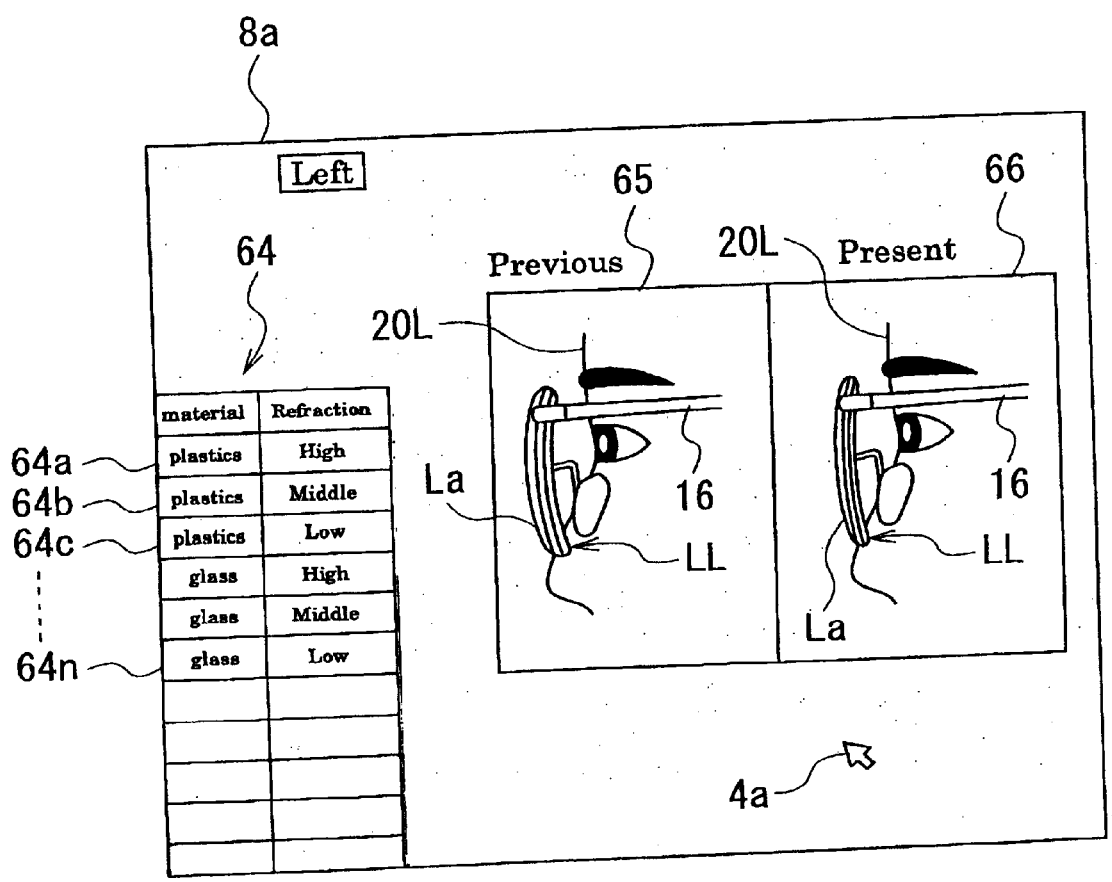
FIG. 17 shows an example for displaying the side of the eyeglass lens according to the control circuit shown in FIG. 1.

Also, similar to the above-mentioned modified example 4, in case where the material of the lens is selected according to "the low refractive index", "the middle refractive index" and "the high refractive index" and the thickness of the end images of the edge (that is, the edge thickness images) Ra, La of the eyeglass lens image LR (or LL) is obtained and displayed, the showing box 65 for displaying the previous synthesized display picture and the showing box 66 for displaying the present synthesized display picture may be displayed up and down in parallel as shown in FIG. 16, and the showing boxes 65, 66 may be displayed at the left and right in parallel as shown in FIG. 17. This display is performed by the operation control circuit 1b.

Also, in this case, as shown in FIG. 16, the showing boxes 67, 68 for performing the facet processing (chamfering processing) simulation of the end portion of the end image of the edge (that is, the edge thickness images) Ra, La of the eyeglass lens image LR (or LL) may be displayed. This display is also performed by the operation control circuit 1b.

This simulation specifies the chamfering location by clicking the straight showing box 69 by the cursor 4a of the mouse 4 and then moving and clicking the cursor 4a of the mouse 4 to the locations P1, P2. This specification is optionally performed. Also, when the location P2 is the curve as shown in the drawing, after the curve showing box 70 is clicked by the cursor 4a of the mouse 4, the cursor 4a of the mouse 4 is moved to the location P2 and then clicked. And, in order to expand/reduce the curvature of the curve at the location P2, the expansion or the reduction is performed whenever clicking, by the clicking the showing box 71 for the expansion or the showing box 72 for the reduction and moving and clicking the cursor 4a of the mouse 4 to the location P2.

And, the contour of the end portion of the end images of the edge (that is, the edge thickness images) Ra, La of the simulated eyeglass lens image LR (or LL) is reflected on the eyeglass lens image LR (or LL) in the showing boxes 65, 66. Thus, the width feeling of the end images of the edge (that is, the edge thickness images) Ra, La of the eyeglass lens image LR (or LL) in the showing boxes 65, 66 can be changed, and the contour of the end portion of the end images of the edge can be easily changed to the state that the appearance is the best. And, the chamfering contour of the obtained end potion of the edge can be used as the lens processing data.

MODIFIED EXAMPLE 6

Also, in the above-mentioned embodiment and modified example, the eyeglass frame displayed on the screen 8a of the liquid crystal displaying device 8 can select and display not only the eyeglass frame having the different shape, but also the eyeglass frame having the different color.

Also, in the above-mention embodiment, using the lens mold contour data (frame contour data) which is actually measured, the lens edge thickness at the location corresponding to the lens mold contour data ($\theta i$, $\rho i$) is obtained with respect to the lens according to the refraction degree of the lens prescription value, but the present invention is not limited to that.

For example, in FIG. 13, the contour and the size of the left and right lens frames FL, FR of the eyeglass frame image 16 overlapped with the facial image 20 and displayed on the displaying screen are obtained by the picture process, and simultaneously, the lens mold contour data ($\theta i$, $\rho i$) of the left and right lens frames FL, FR of the eyeglass frame image 16 displayed on the screen 8a of the liquid crystal displaying device 8 can be operated and obtained from the obtained contour and the size and the above-mentioned synthesized display magnification Mx.

In this case, by obtaining the contours of the internal and external peripheral edges of the left and right lens frames FL, FR and obtaining the contours at the center of the internal and external peripheral edges from the contour data of the internal and external peripheral edges, the size and contour at the center of the width direction of the left and right lens frames FL, FR is obtained, and the lens mold contour data ($\theta i$, $\rho i$) of the lens frames FL, FR are obtained from the size and contour and the above-mentioned synthesized display magnification Mx, thereby the lens mold contour data can be more accurately obtained. Also, the lens mold contour data ($\theta i$, $\rho i$) of the lens frames FL, FR at the predetermined distance from the internal peripheral edge to the external periphery of the left and right lens frames FL, FR may be obtained by the same method.

As shown in FIG. 13, in case where any one of the eyeglass frames 14, 15, 16 having different size is selected and is overlapped with the facial image 20 to display the overlapped image, the operation of the lens mold contour data ($\theta i$, $\rho i$) of the lens frames FL, FR is effective when being used as the data for obtaining the thickness or the contour of the lateral image of the eyeglass lenses inserted to the eyeglass frames 14, 15, 16. Namely, though the measured lens mold contour data is not recorded in the information record reproducing device 9 every eyeglass frame having each size, the lens mold contour data is obtained whenever it is needed, thereby the data amount of the eyeglass frame image which can be recorded in the information record reproducing device 9 can become much.

Also, the lens mold contour data obtained once by the above-mentioned method may be recorded in the information record reproducing device 9. In this case, since the lens mold contour data of the eyeglass frame obtained once needs not to be obtained again, the lens mold contour data of the next eyeglass frame can be quickly used. Also, when the eyeglass frame image is inputted to the operation control circuit 1b and is recorded to the information record reproducing device 9, the lens mold contour data can also be obtained and recorded.

The lens mold contour data obtained by the above-mentioned method can be used as the data for obtaining the lens edge thickness in the modified example 4, and simultaneously, can be used in the facet processing simulation in the modified example 5.

As described in the above, in the eyeglasses selecting system comprising an eyeglass frame inputting means for inputting a plurality of eyeglass frame images including the eyeglass frame of a rimless frame, an eyeglass frame recording means for recording a plurality of eyeglass frame images inputted by said eyeglass frame inputting means, a photographing means for photographing the customer's facial image, a display means for displaying said facial image photographed by said photographing means, a frame picture selecting means for selecting one of the plurality of eyeglass frame images recorded in said eyeglass frame recording means, and a picture synthesizing means for synthesizing the eyeglass frame image selected by said frame picture selecting means with the facial image displayed on said display means, when the eyeglass frame selecting system comprises a data inputting means for inputting a lens prescription value of the eyeglass lens based on the refraction property of said customer's objective eye, an operation control means for obtaining the sizes of the facial image and the eyeglass lens image of the lens prescription value inputted by said data inputting means, synthesizing the eyeglass lens and the facial image having the obtained sizes with said eyeglass frame image through said picture synthesizing means so as to display the synthesized image on said display means, the eyeglass lens picture, the eyeglass frame and the customer's facial image can be synthesized so that the effect of the eyeglass lens based on the customer's lens prescription value can be known.

Also, in case where said picture synthesizing means is set so that an eye image having the eye size viewed through the eyeglass lens of said lens prescription value data in said facial image is synthesized with the eyeglass lens image of said eyeglass frame to be displayed on said display means, when the eyeglass lenses based on the customer's lens prescription value are inserted to the eyeglass frame and the customer wears the eyeglass lenses, the eye image having the customer's actual eye size viewed through the eyeglass lens by a third party or the eye image having the customer's actual eye size viewed through a mirror can be synthesized with the eyeglass frame in the very natural state. Accordingly, since the eyeglass frame can be synthesized with the facial image in the more natural state, the actual image seems to be equal to an image of the eyeglass frame image when the selection is performed, and thus, the satisfactory selection of the eyeglass frame can be possible.

In case where said picture synthesizing means is set so that the lateral image of the eyeglass lens obtained from said lens prescription value data and the lens mold contour data are synthesized with a lateral facial image as said facial image together with said eyeglass frame and the eyeglass lens image to be displayed on said display means, the edge thickness image (the edge image or the edge thickness image) of the eyeglass lens can be synthesized with the eyeglass frame image and the customer's facial image considering the edge thickness of the actual eyeglass lens based on the lens prescription value. As the result, considering the effect of the edge thickness of the eyeglass lens for the appearance, the eyeglass lens or the eyeglass frame can be selected. Also, at this time, by changing the material of the eyeglass lens to the materials having the low refraction, the middle refraction, or the high refraction, the displayed edge thickness is changed to confirm the location relationship between the edge thickness and the eyeglass frame. Also, at this time, the location for forming the V-shape is changed in connection with the eyeglass frame, and can be used to set the V-shape location most suitable for the eyeglass frame.

In case where said operation control means obtains the lens mold contour data by the operation from the size and contour of the eyeglass frame displayed on the display means and the display magnification, the lens mold contour data of the eyeglass frame synthesized with the facial image can be simply and quickly obtained without the lens mold contour data of the eyeglass frame.

In case where said operation control means obtains the lateral image of the eyeglass lens from the lens mold contour data inputted by a lens mold contour measuring device and said lens prescription value data, the lens mold contour data of the eyeglass frame synthesized with the facial image can be simply and quickly used.

In case where said operation control means is set to display a chamfered contour of an end of the edge at the lateral image when the simulation of chamfering process of the end of the edge of the lens lateral image displayed on said display means is performed, the appearance of the end of the edge of the lens lateral image is simply simulated, and the contour of the end of the edge which the appearance is the best can be obtained.

In case where said operation control means is set so that the refractive index of the material of the lens is selected by a material selecting means, a thickness of the lens lateral image is obtained from the selected refractive index, said lens prescription value, the lens mold contour data, and the obtained lens lateral image are synthesized with said lateral facial image together with said eyeglass frame and the eyeglass lens image to display the synthesized image on said display means, the thickness of the lens lateral image can be simply changed, and the appearance can become good.

In case where said operation control means is set so that a previous synthesized display picture and a present synthesized display picture are displayed in parallel when the contour or the thickness of the lens lateral image overlapped with said lateral facial image and displayed has been changed, the eyeglass frame having the good appearance can be simply selected.

(Others)

As this kind of the eyeglass frame selecting system, for example, there are an eyeglasses making apparatus disclosed in Japanese Patent Laid-Open No. Sho 61-80222, an eyeglasses wearing simulation equipment disclosed in Japanese Patent Laid-Open No. Sho 63-76581, or an apparatus disclosed in Japanese Patent Application No. Sho 62-306998. Also, as an apparatus similar to such picture synthesis, there is a produce selecting apparatus disclosed in Japanese Patent Laid Open No. Sho 57-145491.

In the apparatus disclosed in Japanese Patent Laid-Open No. Sho 61-80222, the figure image which removes the eyeglasses is photographed by the video camera, the photographed figure image is stored in the picture storing device as the digital signal the pictures of the eyeglass frame photographed by the video camera is stored in the picture storing device as the digital signal, and at the same time, the eyeglass frame data and the figure image stored in the picture storing device are synthesized. Also, in the apparatus, the video camera is operated so that the person's face is placed at the location of the frame where the eyeglass frame is to be displayed when photographing the figure image, and the eyeglass frame can be synthesized at the predetermined location of the figure image, though the eyeglass frame data is not corrected by the facial size, the location, and the gradient. Thus, the capability of the computer is out of the question.

Also, in the equipment disclosed in Japanese Patent Application No. Sho 62-306988, the eyeglass frame picture called out from the data center is synthesized with the customer's facial image photographed at retail store.

Also, in the equipment disclosed in Japanese Patent Laid-Open No. Sho 63-76581, the eyeglass frame is photographed with the first synthesis magnification, the second synthesis magnification of the photographed figure image is obtained, and at the same time, the synthesis location of the eyeglass frame, the figure image and the third synthesis magnification of the eyeglass frame are calculated, thereby, the eyeglass frame is synthesized with the figure image and then is displayed. Also, in this equipment, the image location, the gradient and the size of the eyeglass frame fitting the photographed figure image are accurately obtained and synthesized, without aligning the location by moving the video camera.

However, in the apparatus disclosed in Japanese Patent Laid-Open No. Sho 61-80222 or the apparatus disclosed in Japanese Patent Application No. Sho 62-306988, the video camera must be operated so that the face of the figure is placed at the location where the eyeglass frame is to be displayed when photographing the figure image. In this case, since the photographing magnification of the figure image is sensitively determined while the camera operator looks at the displaying screen, it is difficult that the magnification conforms to the eyeglass frame. Accordingly, the photographing magnification of the figure image is a little large or small. In this case, because the eyeglass frame is larger or smaller than the figure image, the synthesized picture of the eyeglass frame and the figure image seems to be unnatural.

Also, in the equipment disclosed in Japanese Patent Laid-Open No. Sho 63-76581, since the image location, the gradient and the size (synthesis magnification) of the eyeglass frame are obtained from the magnification or the location of the figure image and the magnification of the eyeglass frame, there is a problem that it takes a considerable time for obtaining the synthesized picture and selecting and synthesizing the plurality of frames.

Accordingly, though the photographing magnification is a little deviated from the synthesis magnification to the eyeglass frame, it is preferable that the correction can be simply and quickly performed.

Also, it is preferable that the selected eyeglass frame can be simply and quickly synthesized with the facial image of the person who selects the frame. Also, it is preferable that the eyeglass frame can be easily and quickly selected in accordance with the taste such as the brand name or frame name. Also, since the selection of the eyeglass frame can be performed in the state the whole is grasped easily, it is preferable that the selected eyeglass frame can be easily and quickly synthesized with the facial image of the person who selects the frame.

As described in the above, though the photographing magnification is a little deviated from the synthesis magnification to the eyeglass frame, the eyeglass frame selecting system in which the correction can be simply and quickly performed must be preferably provided. Also, the eyeglass frame selecting system in which the selected eyeglass frame can be easily and quickly synthesized with the facial image of the person who selects the frame must be preferably provided. It is preferable that the eyeglass frame is easily and quickly selected in accordance with the taste such as the brand name or frame name. Also, since the selection of the eyeglass frame can be performed in the state that the whole is grasped easily, it is preferable that the selected eyeglass frame can be easily and quickly synthesized with the facial image of the person who selects the frame.

Based on the above-mentioned demand, in the eyeglass frame selecting system comprising an eyeglass frame inputting means for inputting a plurality of eyeglass frames, a frame recording means for recording a plurality of eyeglass frame images inputted by said eyeglass frame inputting means, a photographing means for photographing the customer's facial image, a display means for displaying said facial image photographed by said photographing means, a picture selecting means for selecting one of the plurality of eyeglass frame images recorded in said frame recording means, and a picture synthesizing means for synthesizing the eyeglass frame image selected by said picture selecting means with the facial image displayed on said display means, when the size changing means for optionally changing the size of said selected eyeglass frame image is included, the correction can be performed easily and in a short time, though the photographing magnification is a little deviated from the synthesis magnification synthesized to the eyeglass frame.

Also, in case where said size changing means includes the up-button and the down-button displayed on said display means by the operation control means, the changing operation of the size can be performed by the simple composition.

Also, in case where said size changing means includes a plurality of size changing values that are different by stages and is displayed on said display means by the operation control means, the size can be changed, looking at the value for the size.

Based on the above-mentioned demand, in the eyeglass frame selecting system comprising an eyeglass frame inputting means for inputting a plurality of eyeglass frames, a frame recording means for recording a plurality of eyeglass frame images inputted by said eyeglass frame inputting means, a photographing means for photographing the customer's facial image, a display means for displaying said facial image photographed by said photographing means, a picture selecting means for selecting one of the plurality of eyeglass frame images recorded in said frame recording means, and a picture synthesizing means for synthesizing the eyeglass frame image selected by said picture selecting means with the facial image displayed on said display means, when the distance inputting means for inputting the inter-pupil distance is included and at the same time, the picture synthesizing means for displaying on the display means the eyeglass frame image having the size corresponding to the inter-pupil distance which is said selected eyeglass frame image and is inputted by said distance inputting means to be synthesized with the facial image is included, the inter-pupil distance of the person who selects the frame is inputted, thereby, the frame having the size suitable for the person who selects the frame can be selected from the inter-pupil distance and the size of the lens frame and be synthesized with the facial image. Also, at the time of the selection, though the size of the frame is a little large or small the size of the frame with respect to the facial image of the person who selects the frame can be easily changed, thereby the frame having the suitable size can be synthesized with the facial image.

Also, based on the above-mentioned demand, in the eyeglass frame selecting system comprising an eyeglass frame inputting means for inputting a plurality of eyeglass frames, a frame recording means for recording a plurality of the eyeglass frame images inputted by said eyeglass frame inputting means, a photographing means for photographing the customer's facial image, a display means for displaying said facial image photographed by said photographing means, a picture selecting means for selecting one of the plurality of eyeglass frame images recorded in said frame recording means, and a picture synthesizing means for synthesizing the eyeglass frame image selected by said picture selecting means with the facial image displayed on said display means, when the eyeglass frame image relating to the frame contour name or the brand name is recorded in the frame recording means and said picture selecting means can select one of the plurality of eyeglass frame images recorded in said frame recording means in accordance with the frame contour name or the brand name, the eyeglass frame can be selected in accordance with the condition for selecting the taste.

Also, based on the above-mentioned demand, in the eyeglass frame selecting system comprising an eyeglass frame inputting means for inputting a plurality of eyeglass frames, a frame recording means for recording a plurality of eyeglass frame images inputted by said eyeglass frame inputting means, a photographing means for photographing the customer's facial image, a display means for displaying said facial image photographed by said photographing means, a picture selecting means for selecting one of the plurality of eyeglass frame images recorded in said frame recording means, and a picture synthesizing means for synthesizing the eyeglass frame image selected by said picture selecting means with the facial image displayed on said display means, when the eyeglass frame image obliquely viewed is recorded in said frame recording means as the picture for selecting the frame and at the same time, the eyeglass frame image viewed from the front is recorded as the picture for synthesizing the picture in connection with the picture for selecting the frame, the selection of the eyeglass frame can be performed using the picture obliquely viewed in three-dimension so that the characteristics of the whole eyeglass frame is grasped easily, and the synthesis of the eyeglass frame can be simply and quickly performed using the two-dimensional picture which the data amount is little.

Also, in case where the synthesized picture of the previous eyeglass frame and the facial image and the synthesized picture of the present eyeglass frame and the facial image are displayed in parallel on the display means, the eyeglass frame which the fitting feeling and the appearance are good can be simply selected, comparing the previous synthesized display picture and the present synthesized display picture.

What is claimed is:

1. An eyeglass frame selecting system comprising:
   an eyeglass frame inputting means for inputting a plurality of eyeglass frame images including the eyeglass frame of a rimless frame;
   an eyeglass frame recording means for recording a plurality of eyeglass frame images inputted by said eyeglass frame inputting means;
   a photographing means for photographing a customers' facial image;
   a display means for displaying said facial image photographed by said photographing means;
   a frame picture selecting means for selecting one of the plurality of eyeglass frame images recorded in said eyeglass frame recording means; and
   a picture synthesizing means for synthesizing the eyeglass frame image selected by said frame picture selecting means with the facial image displayed on said display means;
   wherein said eyeglass frame selecting system further comprises:
   a data inputting means for inputting lens prescription value data of the eyeglass lens based on a refraction property of said customer's objective eye; and
   an operation control means for obtaining a size of the eyeglass lens image according to the lens prescription value data inputted by said data inputting means to synthesize the eyeglass lens image of the obtained size with said eyeglass frame image through said picture synthesizing means to display a synthesized image on said display means, wherein said picture synthesizing means is set so that a lens lateral image of the eyeglass lens obtained from lens prescription value data and lens mold contour data are synthesized with a lateral facial image as said facial image together with said eyeglass frame and the eyeglass lens image to be displayed on said display means.

2. The eyeglass frame selecting system according to claim 1, wherein said picture synthesizing means is set so that an eye image having an eye size viewed through an eyeglass lens of said lens prescription value data on said facial image is synthesized in the eyeglass lens image of said eyeglass frame to be displayed on said display means.

3. The eyeglass frame selecting system according to claim 1, wherein said picture synthesizing means is set so that a lens lateral image of the eyeglass lens obtained from said lens prescription value data and lens mold contour data are synthesized with a lateral facial image as said facial image together with said eyeglass frame and the eyeglass lens image to be displayed on said display means.

4. An eyeglass frame selecting system according to claim 3, wherein said operation control means obtains said lens mold contour data by an operation from the size and contour of the eyeglass frame displayed on the display means and the display magnification thereof.

5. The eyeglass frame selecting system according to claim 4, wherein said operation control means is set so that previously synthesized display picture and a new synthesized display picture are displayed in parallel when contour or thickness of the lens lateral image which is synthesized with said lateral facial image has been changed.

6. The eyeglass frame selecting system according to claim 1, wherein said operation control means obtains a size of said customer's facial image.

7. An eyeglass frame selecting system comprising:
   an eyeglass frame inputting means for inputting a plurality of eyeglass frame images including the eyeglass frame of a rimless frame;
   an eyeglass frame recording means for recording a plurality of eyeglass frame images inputted by said eyeglass frame inputting means;
   a photographing means for photographing a customer's facial image;
   a display means for displaying said facial image photographed by said photographing means;
   a frame picture selecting means for selecting one of the plurality of eyeglass frame images recorded in said eyeglass frame recording means; and
   a picture synthesizing means for synthesizing the eyeglass frame image selected by said frame picture selecting means with the facial image displayed on said display means;
   wherein said eyeglass frame selecting system further comprises:
   a data inputting means for inputting lens prescription value data of the eyeglass lens based on a refraction property of said customer's objective eye; and
   an operation control means for obtaining a size of the eyeglass lens image according to the lens prescription value data inputted by said data inputting means to synthesize the eyeglass lens image of the obtained size with said eyeglass frame image through said picture synthesizing means to display a synthesized image on said display means, wherein said picture synthesizing means is set so that a lens lateral image of the eyeglass lens obtained from said lens prescription value data and lens mold contour data are synthesized with a lateral facial image as said facial image together with said eyeglass frame and the eyeglass lens image to be displayed on said display means, and said operation control means is set to display a chamfered contour of an end of an edge on the lens lateral image when a simulation of chamfering process of the end of the edge of the lens lateral image displayed on said display means, has been performed.

8. The eyeglass frame selecting system according to claim 7, wherein said operation control means is set so that previously synthesized display picture and a new synthesized display picture are displayed in parallel when contour or thickness of the lens lateral image which is synthesized with said lateral facial image has been changed.

9. An eyeglass frame selecting system comprising:

an eyeglass frame inputting means for inputting a plurality of eyeglass frame images including the eyeglass frame of a rimless frame;

an eyeglass frame recording means for recording a plurality of eyeglass frame images inputted by said eyeglass frame inputting means;

a photographing means for photographing a customer's facial image;

a display means for displaying said facial image photographed by said photographing means;

a frame picture selecting means for selecting one of the plurality of eyeglass frame images recorded in said eyeglass frame recording means; and a picture synthesizing means for synthesizing the eyeglass frame image selected by said frame picture selecting means with the facial image displayed on said display means;

wherein said eyeglass frame selecting system further comprises:

a data inputting means for inputting lens prescription value data of the eyeglass lens based on a refraction property of said customer's objective eye; and an operation control means for obtaining a size of the eyeglass lens image according to the lens prescription value data inputted by said data inputting means to synthesize the eyeglass lens image of the obtained size with said eyeglass frame image through said picture synthesizing means to display a synthesized image on said display means; wherein said picture synthesizing means is set so that a lens lateral image of the eyeglass lens obtained from said lens prescription value data and lens mold contour data are synthesized with a lateral facial image as said facial image together with said eyeglass frame and the eyeglass lens image to be displayed on said display means; and said operation control means is set so that a refractive index of a material of the lens is selected by a material selecting means, thereby, a thickness of the lens lateral image is obtained from a selected refractive index, the lens prescription value and the lens mold contour data, and the obtained lens lateral image is synthesized with said lateral facial image together with said eyeglass frame and the eyeglass lens image to be displayed on said display means.

* * * * *